US012802621B2

(12) United States Patent
Kim

(10) Patent No.: US 12,802,621 B2
(45) Date of Patent: Nov. 17, 2026

(54) DISPLAY DEVICE

(71) Applicant: LG DISPLAY CO., LTD., Seoul (KR)

(72) Inventor: Sun Young Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/979,110

(22) Filed: Dec. 12, 2024

(65) Prior Publication Data

US 2025/0265973 A1 Aug. 21, 2025

(30) Foreign Application Priority Data

Feb. 15, 2024 (KR) ........................ 10-2024-0021452

(51) Int. Cl.
*G09G 3/32* (2016.01)

(52) U.S. Cl.
CPC ......... *G09G 3/32* (2013.01); *G09G 2300/026* (2013.01); *G09G 2300/0443* (2013.01); *G09G 2300/0819* (2013.01); *G09G 2300/0852* (2013.01); *G09G 2300/0861* (2013.01); *G09G 2310/0262* (2013.01); *G09G 2310/0289* (2013.01); *G09G 2310/08* (2013.01); *G09G 2320/045* (2013.01); *G09G 2330/021* (2013.01); *G09G 2340/16* (2013.01)

(58) Field of Classification Search
CPC ............... G09G 3/32; G09G 2300/026; G09G 2300/0443; G09G 2300/0819; G09G 2300/0852; G09G 2300/0861; G09G 2310/0262; G09G 2310/0289; G09G 2310/08; G09G 2320/045; G09G 2330/021; G09G 2340/16
See application file for complete search history.

(56) References Cited

U.S. PATENT DOCUMENTS

2017/0046006 A1* 2/2017 Kim ...................... G06F 3/0443
2019/0066583 A1* 2/2019 Chang .................. G09G 3/3233
2020/0327843 A1* 10/2020 Ahmed .................... G09G 3/32
(Continued)

FOREIGN PATENT DOCUMENTS

CN 115440162 A 12/2022
EP 3 675 099 A1 7/2020
(Continued)

*Primary Examiner* — Ke Xiao
*Assistant Examiner* — Jennifer L Zubajlo
(74) *Attorney, Agent, or Firm* — Birch, Stewart, Kolasch & Birch, LLP

(57) ABSTRACT

A display device can include a display panel including a plurality of data lines, a plurality of gate lines, and a plurality of pixels, at least one of the plurality of pixels including a main group of sub-pixels having a first-first sub-pixel, a second-first subpixel and a third-first subpixel, and a redundancy group of sub-pixels having first-second sub-pixel, a second-second subpixel and a third-second subpixel, and a controller configured to drive the main group of sub-pixels and the redundancy group of sub-pixels in an alternating manner to display images. Also, the first-first sub-pixel and the first-second sub-pixel are configured to emit a same first color of light, the second-first sub-pixel and the second-second sub-pixel are configured to emit a same second color of light, and the third-first sub-pixel and the third-second sub-pixel are configured to emit a same third color of light.

23 Claims, 22 Drawing Sheets

(56) References Cited

U.S. PATENT DOCUMENTS

| | | | | |
|---|---|---|---|---|
| 2021/0398472 | A1* | 12/2021 | Kim | G09G 3/3266 |
| 2022/0051616 | A1* | 2/2022 | Li | G09G 3/3208 |
| 2022/0208115 | A1* | 6/2022 | Kim | G09G 3/3266 |
| 2024/0087524 | A1 | 3/2024 | Xu et al. | |
| 2025/0209981 | A1* | 6/2025 | He | G09G 3/3233 |
| 2025/0252902 | A1* | 8/2025 | Kim | G09G 3/3266 |

FOREIGN PATENT DOCUMENTS

| | | | | | |
|---|---|---|---|---|---|
| KR | 10-2021-0144403 | A | | 11/2021 | |
| KR | 20210144403 | A | * | 11/2021 | G09G 3/3275 |
| KR | 10-2022-0014373 | A | | 2/2022 | |
| KR | 20220014373 | A | * | 2/2022 | G09G 3/3648 |
| KR | 10-2022-0064463 | A | | 5/2022 | |
| KR | 20220064463 | A | * | 5/2022 | G09G 3/3233 |

* cited by examiner

DISPLAY DEVICE

CROSS-REFERENCE TO RELATED APPLICATION

This application claims priority to Korean Patent Application No. 10-2024-0021452, filed in the Republic of Korea, on Feb. 15, 2024, the entirety of which is incorporated by reference into the present application as if fully set forth herein.

BACKGROUND

Field

The present disclosure relates to a display device.

Discussion of Related Art

Various flat panel display devices such as a liquid crystal display and an electroluminescent display can be used to display information to a user. The electroluminescent display device can display an input image by emitting light by itself without a backlight by using the light-emitting elements disposed on each of the pixels. The light-emitting elements of the electroluminescent display device can be categorized into an organic light-emitting element and an inorganic light-emitting element according to the material of the light-emitting layer.

In recent years, the display devices that use a light emitting diode (LED), an inorganic light-emitting device, as the light-emitting element of pixels have been attracted attention as the next generation of the display devices. Because the LEDs are made of inorganic materials, they do not require a separate encapsulation layer to protect the organic material from moisture, and they have an excellent reliability and a longer lifespan than the OLEDs. The LEDs also have a fast light-up speed, excellent luminous efficiency, and are resistant to impact.

A driving period of a pixel circuit can be divided into a period for writing pixel data and a light emission period of an input image within one frame period. However, because pixel data, scan signals, and light emission signals of the input image should be continuously supplied for each frame to drive the pixel circuit, it can consume a large amount of power, require a large amount of response power to be supplied, and cause various heating issues. Thus, a need exists for a display device having a configuration that can reduce power consumption, improve image quality, and extend the lifespan of the device.

SUMMARY OF THE DISCLOSURE

The present disclosure is directed to solving all the above-described necessity and problems. The present disclosure provides a display device.

It should be noted that objects of the present disclosure are not limited to the above-described objects, and other objects of the present disclosure will be apparent to those skilled in the art from the following descriptions.

A display device according to embodiments of the present disclosure can include a display panel in which a plurality of data lines, a plurality of gate lines, and a plurality of pixels are arranged, in which each of the plurality of pixels includes a sub-pixel of a first color including a (1-1)th sub-pixel and a (1-2)th sub-pixel, a sub-pixel of a second color including a (2-1)th sub-pixel and a (2-2)th sub-pixel, and a sub-pixel of a third color including a (3-1)th sub-pixel and a (3-2)th sub-pixel, and in which the (1-1)th, (2-1)th, and (3-1)th sub-pixels and the (1-2)th, (2-2)th, and (3-2)th sub-pixels are alternately driven at intervals of at least one frame period.

A display device according to embodiments of the present disclosure can include a display panel in which a plurality of data lines, a plurality of gate lines, and a plurality of pixels are arranged, a data driver configured to output a data voltage to the data lines, a gate driver configured to output a gate signal to the gate lines, and a timing controller configured to apply pixel data and a data timing control signal of an input image to the data driver and to apply a gate timing control signal to the gate driver, in which the timing controller determines whether the pixel data of the input image is a still image for each frame, and modulates the data timing control signal and the gate timing control signal if the pixel data of the input image is the still image as a result of the determination.

The present disclosure can reduce power consumption by alternately driving the main sub-pixels and redundancy sub-pixels for each color, but synchronizing data and scan signals when the input image has a still image or a driving frequency is low so that they are simultaneously turned on or off for at least every one frame.

The present disclosure can further reduce power consumption by turning off the light emission signal for at least every one frame when it is the still image or the driving frequency is low.

In the present disclosure, since power consumption can be reduced, low power driving can be possible.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1A:
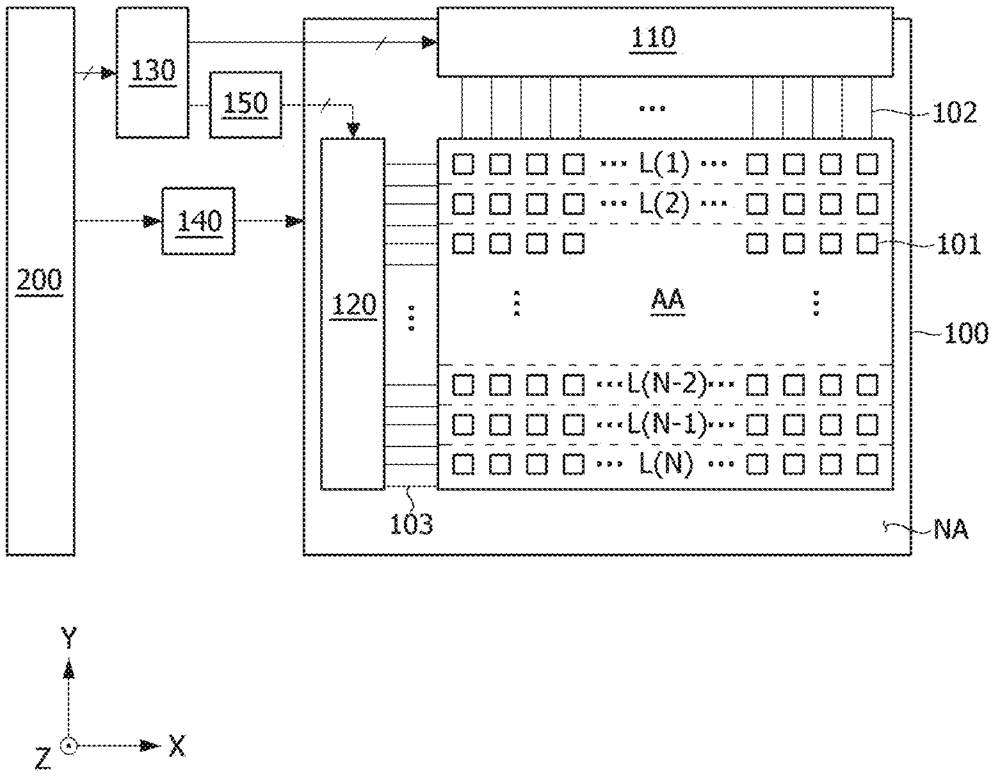
FIGS. 1A and 1B are block diagrams illustrating a display device according to an embodiment of the present disclosure.

Advantages and features of the present specification and methods of achieving them will become apparent with reference to embodiments, which are described in detail, in conjunction with the accompanying drawings. However, the present specification is not limited to the embodiments to be described below and can be implemented in different forms, the embodiments are only provided to completely disclose the present disclosure and completely convey the scope of the present disclosure to those skilled in the art, and the present specification is only defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology can unnecessarily obscure the gist of the present disclosure, the detailed description thereof will be omitted.

When “including,” “having,” “consisting,” and the like mentioned in the present specification are used, other parts can be added unless “only” is used. A situation in which a component is expressed in a singular form includes a plural form unless explicitly stated otherwise.

In interpreting the components, it should be understood that an error range is included even when there is no separate explicit description.

In the situation of a description of a positional relationship, for example, when the positional relationship of two parts is described as “on,” “at an upper portion,” “at a lower portion,” “next to,” and the like, one or more other parts can be located between the two parts unless “immediately” or “directly” is used.

Although first, second, and the like are used to describe various components, these components are not limited by these terms. These terms are only used to distinguish one component from another. Accordingly, a first component, which is mentioned, below can also be a second component within the technical spirit of the present disclosure. Also, the term “can” includes all meanings and definitions of the term “may.”

The same reference numerals can refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit can include a plurality of transistors. Transistors can be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the situation of the n-channel transistor, a gate-on voltage can be a gate high voltage, and a gate-off voltage can be a gate low voltage. In the situation of the p-channel transistor, a gate-on voltage can be a gate low voltage, and a gate-off voltage can be a gate high voltage.

Figure 1B:
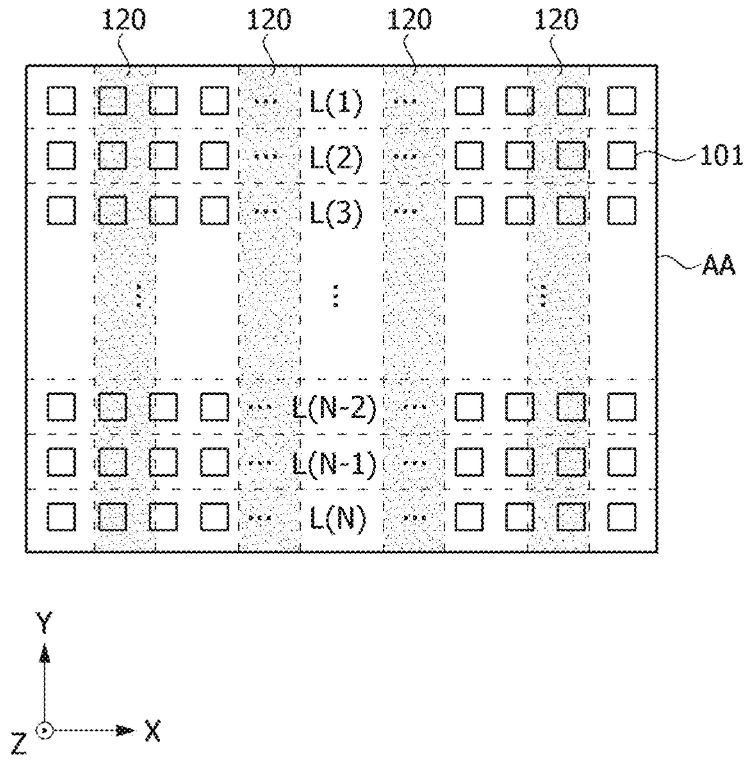
Figure 2:
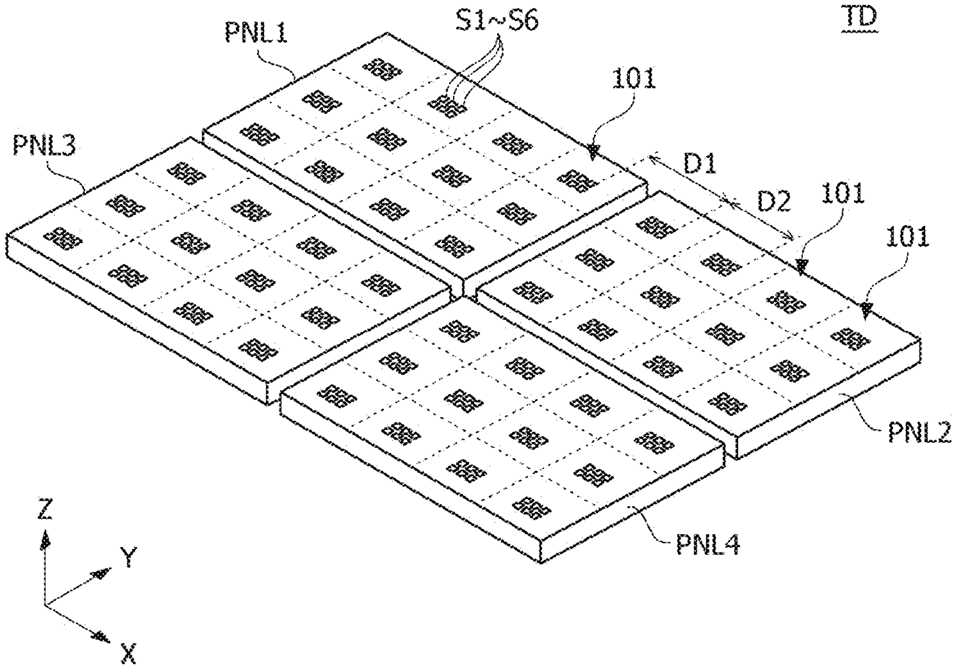
FIG. 2 is a diagram illustrating one example of a tiling display according to an embodiment of the present disclosure.
Figure 3:
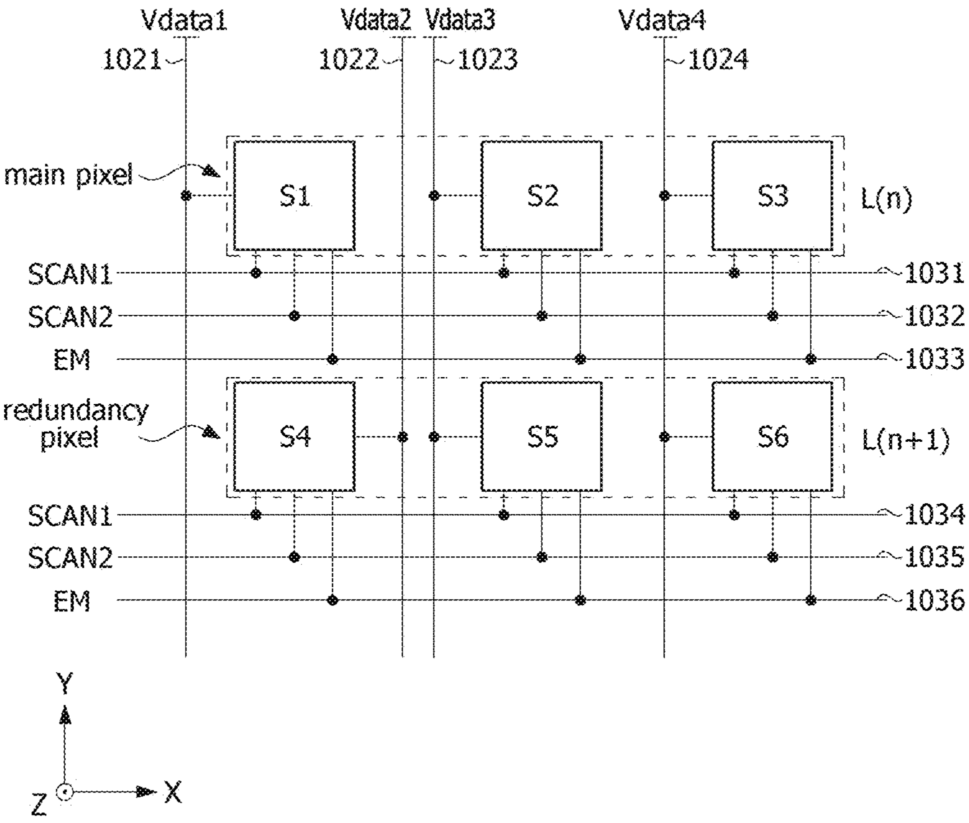
FIG. 3 is a diagram illustrating a unit pixel structure according to an embodiment of the present disclosure.

FIGS. 1A and 1B are block diagrams illustrating a display device according to an embodiment of the present disclosure. FIG. 2 is a diagram illustrating one example of a tiling display according to an embodiment of the present disclosure. FIG. 3 is a diagram illustrating a unit pixel structure according to an embodiment of the present disclosure.

Referring to FIGS. 1A and 1B, a display device according to one embodiment of the present disclosure includes a display panel 100, a display panel driving circuit for writing pixel data to pixels 101 of the display panel 100, and a power supply 140 that generates power required to drive the pixels 101 and the display panel driving circuit.

A substrate of the display panel 100 can be a plastic substrate, a thin glass substrate, or a metal substrate, but is not limited thereto. The display panel 100 can be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 can have a curved perimeter.

The display panel 100 can be implemented as a non-transmissive display panel or a transmissive display panel. The transmissive display panel can be applied to a transparent display device in which an image is displayed on a screen and a real object is visible beyond the display panel. The display panel 100 can be manufactured as a flexible display panel. In addition, the display panel 100 can be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 can further include power lines connected in common to the pixels 101. The power lines are connected in common to the pixels 101 to supply the pixels with a constant voltage required to drive the pixels 101. The power lines can be implemented as long stripe wires along the first direction or the second direction, or as mesh wires in which wires in the first direction and wires in the second direction are electrically connected.

Each of the pixels 101 can be divided into a red sub-pixel, a green sub-pixel, and a blue sub-pixel for color implementation. Each of the pixels can further include a white sub-pixel. Each of the sub-pixels includes a pixel circuit for driving a light emitting element. The pixel circuits are connected to the data lines, the gate lines, and the power lines. Hereinafter, a "pixel" can be interpreted as a "sub-pixel."

The pixel array includes a plurality of pixel lines L(1) to L(N). Each of the pixel lines L(1) to L(N) includes one line of pixels arranged along a gate line direction (the X-axis direction) in the pixel array of the display panel 100. Pixels arranged in the one pixel line can share the gate line 103. Pixels arranged in a column direction (the Y-axis direction) along a data line direction can share the same data line 102. One horizontal period is a time obtained by dividing one frame period by the total number of the pixel lines L(1) to L(N).

The power supply 140 uses a DC-DC converter to generate a constant voltage (or a direct current (DC) voltage) required to drive the pixel array of the display panel 100 and the display panel driving circuit. The DC-DC converter can include a charge pump, a regulator, a buck converter, a boost converter, and the like. The power supply 140 can adjust the level of an input voltage inputted from a host system 200 to output constant voltages such as a gamma reference voltage, a data driving voltage, a gate low voltage, a gate high voltage, a pixel driving voltage, and a pixel base voltage. The gamma reference voltage and the data driving voltage are supplied to a data driver 110. The dynamic range of a data voltage outputted from the data driver 110 is determined by the voltage range of the gamma reference voltage. The dynamic range of the data voltage is a voltage range between the highest grayscale voltage and the lowest grayscale voltage. The data driving voltage is a voltage supplied to the VDD terminal of the output buffer from each channel of the data driver 110 to drive the output buffer.

The gate high voltage and the gate low voltage are supplied to a level shifter 150 and a gate driver 120. The constant voltages, such as the pixel driving voltage and the pixel base voltage, are supplied to the pixels 101 through the power lines connected in common to the pixels 101. The pixel driving voltage can be supplied to the display panel 100 from a main power source of the host system 200. In this situation, the power supply 140 does not need to output the pixel driving voltage.

The display panel driving circuit writes pixel data of the input image to the pixels of the display panel 100 under the control of a timing controller 130. The display panel driving circuit includes the data driver 110 and the gate driver 120.

The display panel driving circuit can further include a touch sensor driver for driving touch sensors. The touch sensor driver is omitted in FIG. 1. The data driver 110 and the touch sensor driver can be integrated into a single drive integrated circuit (IC). The timing controller 130, the power supply 140, the level shifter 150, the data driver 110, the touch sensor driver, and the like can be further integrated into the drive IC.

The data driver 110 receives the pixel data of the input image as a digital signal from the timing controller 130 and outputs the data voltage. The data driver 110 converts the pixel data of the input image into a gamma compensation voltage using a digital to analog converter (DAC) and outputs the data voltage. The gamma reference voltage is divided into gamma compensation voltages for each grayscale by a voltage divider circuit of the data driver 110 and supplied to the DAC. The DAC generates the data voltage with a gamma compensation voltage corresponding to a grayscale value of the pixel data. The data voltage outputted from the DAC is outputted to the data line 102 through an output buffer in each of data output channels of the data driver 110.

The gate driver 120 can be formed in the display panel 100 together with a TFT array of the pixel array and the wires. The gate driver 120 can be disposed in the non-display area NA outside the display area AA in the display panel 100, or at least a portion thereof can be disposed in the display area AA. For example, the gate driver 120 can be embedded within a display area AA as shown in FIG. 1B. In this situation, the pixel circuits and light-emitting elements of the pixels 101 can overlap with the circuit of the gate driver 120 in the Z-axis direction of the display panel 100.

The gate driver 120 can be disposed in either a left non-display area NA or a right non-display area NA outside the display area AA in the display panel 100 to supply the gate signal to the gate lines 103 in a single feeding method. In the single feeding method, the gate signal is applied to one end of the gate lines. The gate driver 120 can be disposed in the left non-display area NA and the right non-display area NA in the display panel 100 to apply the gate signal to the gate lines 103 by a single feeding method or a double feeding method. In the double feeding method, the gate signal is applied simultaneously to both ends of the gate lines 103. At least some circuits of the gate driver 120 can be disposed within the display area AA.

The gate driver 120 can include a shift register and/or an edge trigger to output and shift pulses of the gate signal under the control of the timing controller 130. The gate driver 120 can output a plurality of gate signals with different waveforms. In this situation, the gate driver 120 can include a plurality of gate drivers that output different gate signals.

The gate signal can include a first scan signal SCAN1, a second scan signal SCAN2 and a light emission signal (hereinafter referred to as "EM signal") EM. In this situation, the gate driver can include a first gate driver that outputs the first scan signal SCAN1, a second gate driver that outputs the second scan signal SCAN2, and a third gate driver that outputs the EM signal.

The timing controller 130 receives the pixel data of the input image and a timing signal synchronized with the pixel data from the host system 200. The timing signal can include a vertical synchronization signal Vsync, a horizontal synchronization signal Hsync, and a data enable signal DE. The vertical sync signal Vsync indicates one frame period including a pulse generated once every frame period. Pulses of the horizontal synchronization signal Hsync and the data enable signal DE can be one horizontal period (1H). The timing controller 130 can determine one frame period (or vertical period) and a horizontal period by counting the data enable signal DE. In this situation, the vertical synchronization signal Vsync and the horizontal synchronization signal Hsync can be omitted. The timing controller 130 can determine that the current frame period is how many frame periods by counting the rising edge or falling edge of the pulses in the start pulse of the timing signal Vsync, Hsync, and DE or a gate timing signal.

The timing controller 130 can control the operation timings of the data driver 110 and the gate driver 120 based on the timing signals Vsync, Hsync, and DE received from the host system 200. The gate timing signal includes a start pulse and a clock to control the operation timings of the gate driver 120. The gate timing signal output from the timing controller 130 can be input to the shift register of the gate driver 120 through the level shifter 150 and can be used to control the pulse of the gate signal output from the gate driver 120. The level shifter 150 can receive the gate timing signal and generate a clock to provide it to the gate driver 120. The level shifter 150 can be mounted on a control printed circuit board (PCB) along with the timing controller 130 and the power supply 140, or it can be mounted on a source PCB that is electrically connected to a chip on film (COF) on which the data driver 110 is mounted. The input signal to the level shifter 150 is a signal of a digital signal voltage level. The clock output from the level shifter 150 can swing between the gate-high voltage and the gate-low voltage. A data timing control signal generated from the timing controller 130 is transmitted to the data driver 110.

The host system 200 can scale an image signal from a video source to match the resolution of the display panel 100, and can transmit it to the timing controller 130 together with the timing control signal.

The display device can be implemented as a tiled display (TD) in which a plurality of display panels are combined in the same plane to provide a wide-screen, as shown in FIG. 2.

Referring to FIG. 2, a wide-screen tiled display TD includes a plurality of display panels PNL1 to PNL4 disposed on an X-Y plane. When the non-display area NA is minimized at the outer periphery of each display panel PNL1 to PNL4, a wide-screen image can be reproduced with no visible seams between adjacent display panels PNL1 to PNL4. The gate driver 120 can be embedded in the display area AA of the display panels PNL1 to PNL4 such that the outer periphery non-display area NA of the display panels PNL1 to PNL4 can be minimized.

The display panels 100 can be assembled on a plane such that the distance D1 between the outermost pixels 101 adjacent at the boundaries between adjacent display panels PNL1 to PNL4 is substantially the same as the distance D2 between adjacent pixels 101 within the display area AA of a single display panel PNL1 to PNL4. As a result, the distances D1 and D2 between the pixels 101 are the same throughout the wide-screen display area of the tiled display device TD, and thus a seam region is not visible.

The pixel 101 can include two sub-pixels for each color, as shown in FIG. 3 (e.g., a pixel unit 101 can include six sub-pixels). Each of the pixels 101 includes first-first and first-second sub-pixels S1 and S4 which are adjacent in a second direction Y parallel to the data lines 1021 to 1026 and in which pixel data of first color is written, second-first and second-second sub-pixels S2 and S5 which are adjacent in the second direction Y and in which pixel data of second color is written, and third-first and third-second sub-pixels S3 and S6 which are adjacent in the second direction Y and in which pixel data of third color is written. The first color can be, but is not limited to, red, the second color can be green, and the third color can be blue. For example, the first-first and first-second sub-pixels S1 and S4 can be red sub-pixels SP_R to which a data voltage of red data is applied. The second-first and second-second sub-pixels S2 and S5 can be green sub-pixels SP G to which a data voltage of the green data is applied. The third-first and third-second sub-pixels S3 and S6 can be blue sub-pixels SP_B to which a data voltage of the blue data is applied.

The first-first, second-first, and third-first sub-pixels S1, S2, and S3 can be interpreted as main sub-pixels. The first-second, second-second, and third-second sub-pixels S2 and S5, and S6 can be interpreted as redundancy or auxiliary sub-pixels.

In this situation, the sub-pixels S1 and S4 can be connected to different data lines, the sub-pixels S2 and S5 can be commonly connected to one data line, the sub-pixels S3 and S6 can be commonly connected to one data line.

Also, the gate lines connected to the sub-pixels of the same color can be separated for each pixel line. For example, the sub-pixels S1, S2, and S3 arranged in an (n)th pixel line L(n) (where n is a natural number) can be connected to a first gate lines or a first group of gate lines 1031, 1032, and 1033, and the sub-pixels S4, S5, and S6 arranged in an (n+1)th pixel line L(n+1) can be connected to a second gate lines or a second group of gate lines 1034, 1035, and 1036.

Figure 4:
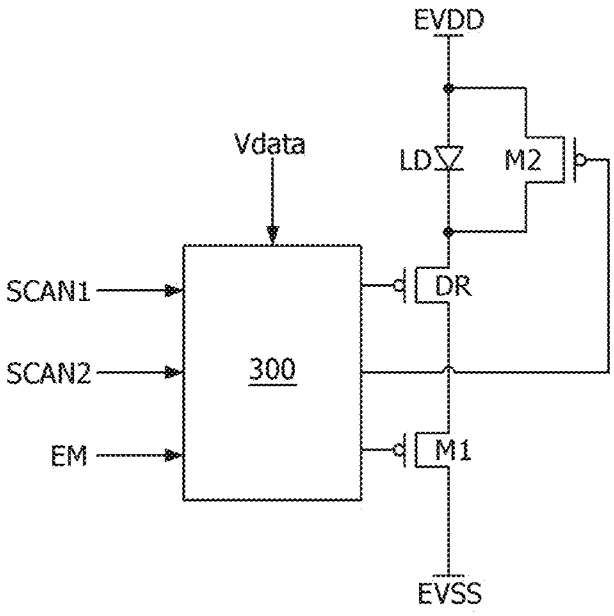
FIG. 4 is a circuit diagram illustrating a pixel circuit according to an embodiment of the present disclosure.

FIG. 4 is a circuit diagram illustrating a pixel circuit according to one embodiment of the present disclosure.

Figure 16:
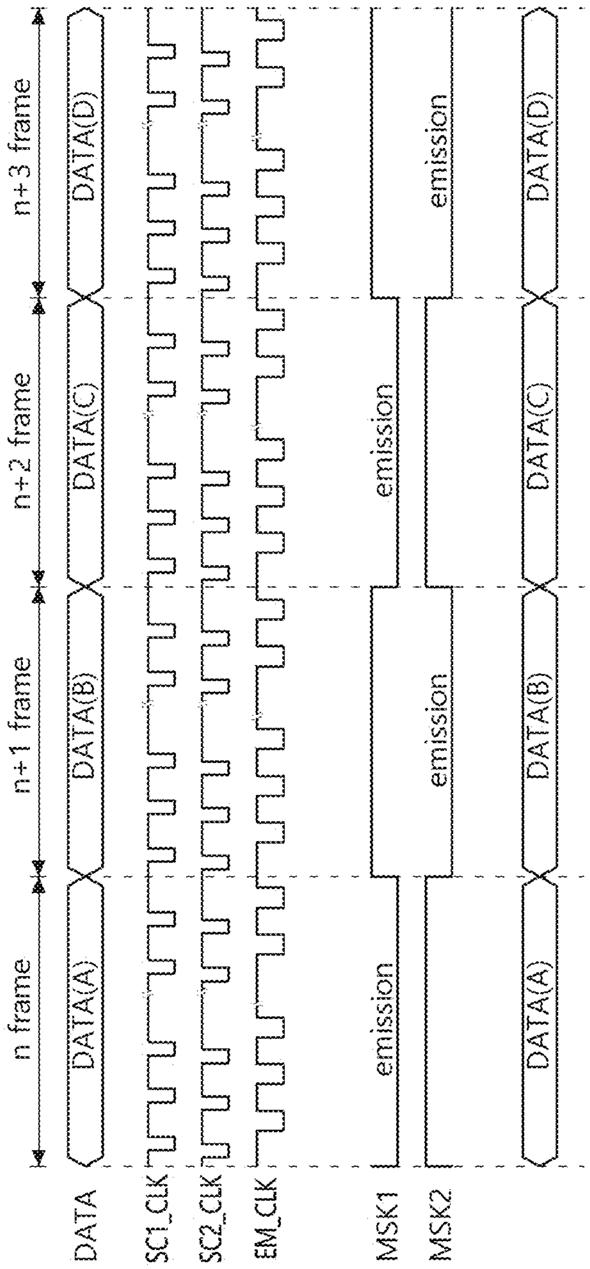
FIGS. 16 and 17 are diagrams for explaining a pixel driving principle according to an embodiment.

Referring to FIG. 16, the pixel circuit includes a light-emitting element LD, a driving transistor DR, switch transistors M1 and M2, and a compensation circuit 300. The driving transistor DR and the switch transistor M1 can be implemented as p-channel transistors, but are not limited thereto.

The light-emitting element LD can include an anode electrode, a cathode electrode, and a light-emitting layer. A pixel driving voltage EVDD can be applied to the anode electrode of the light-emitting element LD. The cathode electrode of the light-emitting element LD can be connected to the driving transistor DR. The light-emitting element LD can be, but is not limited to, a light-emitting element such as an OLED, mini-LED, micro-LED, or the like. The mini-LED or micro-LED can have a vertical structure in which electrodes are arranged above and below a semiconductor chip on which the light-emitting element LD is integrated. The semiconductor chip in which the light-emitting element LD is integrated can be implemented in a lateral structure or a flip chip structure.

The light-emitting element LD, the driving transistor DR, and the switch transistor M1 can be connected in series between the pixel driving voltage EVDD and a ground voltage EVSS.

The driving transistor DR regulates the current flowing through a drain-source channel according to a gate-source voltage thereof. The gate-source voltage of the driving transistor DR is varied with a data voltage Vdata of the pixel data applied to a gate electrode of the driving transistor DR. Accordingly, the current flowing through the driving transistor DR is varied with the data voltage Vdata. The light-emitting element LD can be driven by a current from the driving transistor DR to emit light.

The driving transistor DR can be connected between the light-emitting element LD and the first switch transistor M1. The driving transistor DR includes a gate electrode to which a data voltage Vdata is applied, a first electrode connected to the cathode electrode of the light-emitting element LD, and a second electrode connected to a first electrode of the first switch transistor M1.

The first switch transistor M1 can be connected between the driving transistor DR and the ground voltage EVSS to switch the current path between the pixel drive voltage EVDD and the ground voltage EVSS. The first switch transistor M1 can be turned on in response to a gate-on voltage of the color-specific EM signal EM_R/G/B and turned off in response to a gate-off voltage of the color-specific EM signal EM_R/G/B. When the first switch transistor M1 is turned on, the driving transistor DR and the light-emitting element LD can be electrically connected so that a current is supplied to the light-emitting element LD. When the first switch transistor M1 is turned off, the current path between the pixel driving voltage EVDD and the ground voltage EVSS is blocked so that no current is supplied to the light-emitting element LD.

The pixel circuit can further include a second switch transistor M2. The second switch transistor M2 is connected between the cathode electrode and the anode electrode of the light-emitting element LD, and can be turned on in response to the gate-on voltage of the first scan signal SCAN1 and turned off in response to the gate-off voltage. When the second switch transistor M2 is turned on, the cathode electrode and the anode electrode of the light-emitting element LD are short-circuited so that the light-emitting element LD does not emit light. When the second switch transistor M2 is turned off, the current can flow to the light-emitting element LD. The second switch transistor M2 can prevent the light-emitting element LD from emitting light when the pixel circuit is initialized and when the threshold voltage of the driving transistor DR is sampled.

The compensation circuit 300 can be connected to a data line to which the data voltage Vdata is applied, gate lines to which gate signals SCAN1, SCAN2 and EM_R/G/B are applied, the gate electrode of the driving transistor DR, and the gate electrodes of the switch transistors M1 and M2. The compensation circuit 300 can include a plurality of transistors and one or more capacitors. The compensation circuit 300 transfers the data voltage Vdata to the gate electrode of the driving transistor DR. The compensation circuit 500 samples the threshold voltage of the driving transistor DR into the capacitor to compensate the gate voltage of the driving transistor DR by the amount of the threshold voltage of the driving transistor DR.

The compensation circuit 300 can perform the compensation by sampling the threshold voltage of the driving transistor DR using a source follower or a diode connection circuit.

Figure 5:
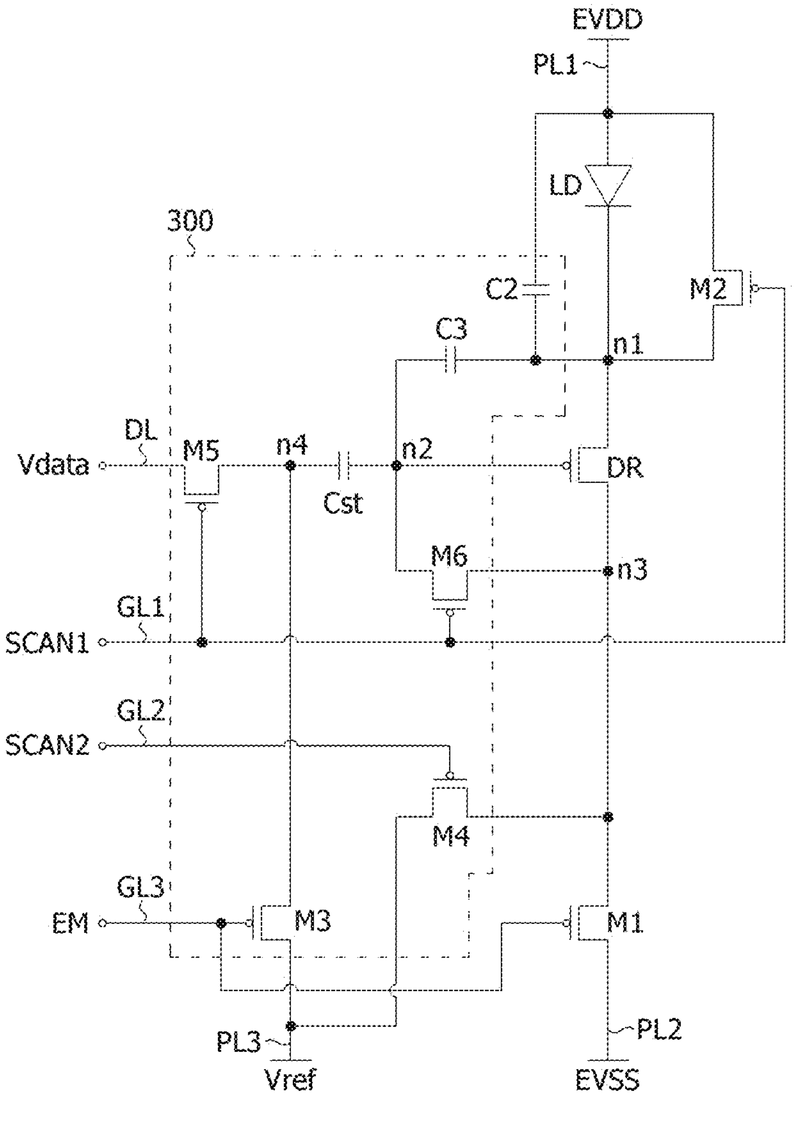
FIG. 5 is a circuit diagram illustrating one example applicable to the pixel circuit shown in FIG. 4 according to an embodiment of the present disclosure.
Figure 6:
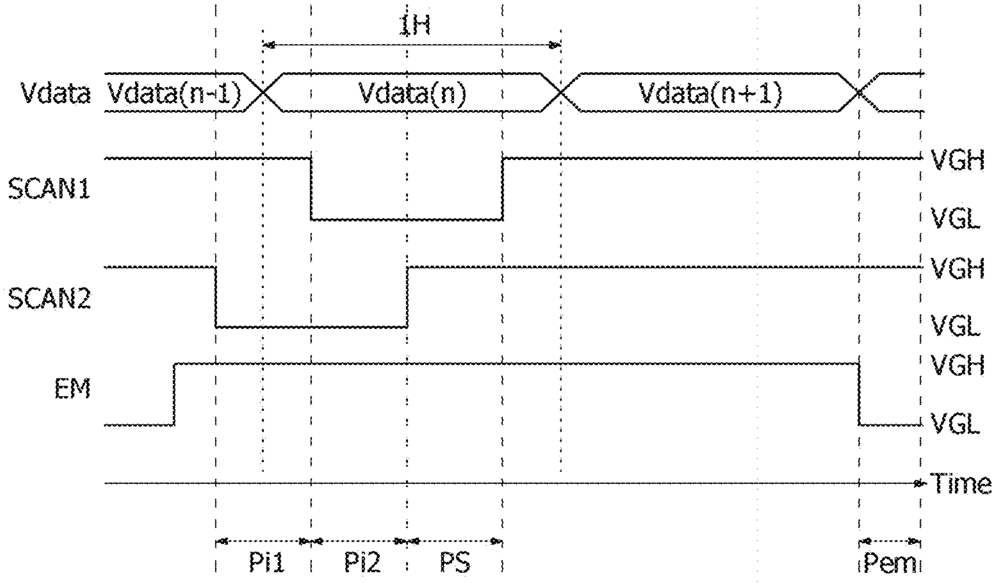
FIG. 6 is a diagram illustrating a driving timing of the pixel circuit shown in FIG. 5 according to an embodiment of the present disclosure.

FIG. 5 is a circuit diagram illustrating one example applicable to the pixel circuit shown in FIG. 4 according to an embodiment of the present disclosure. FIG. 6 is a diagram illustrating a driving timing of the pixel circuit shown in FIG. 5 according to an embodiment of the present disclosure. FIGS. 7A to 7D are circuit diagrams for explaining an operation principle of the pixel circuit shown in FIG. 5 according to an embodiment of the present disclosure.

Referring to FIG. 5, the pixel circuit according to an embodiment can include a driving transistor DR driving the light-emitting element LD, a plurality of switch transistors M1 to M6, and a first capacitor Cst. The pixel circuit can further include second and third capacitors C2 and C3. The transistors DR and M1 to M6 of the pixel circuit can be p-channel transistors, but are not limited thereto.

The pixel driving voltage EVDD, the ground voltage EVSS, and the reference voltage Vref can be applied to the pixel circuit. The pixel driving voltage EVDD can be a constant voltage selected between 8V and 13V, and the ground voltage EVSS and the reference voltage Vref can be a constant voltage selected between −2V and 1V. The reference voltage Vref can be a constant voltage equal to or higher than the ground voltage EVSS, but is not limited thereto.

The data voltage Vdata and the gate signals SCAN1, SCAN2, and EM can be input to the pixel circuit. The data voltage Vdata can be a dynamic range voltage between 0V and SVDD, but is not limited thereto. The SVDD is a data driving voltage for driving the output buffer of the data driver 110. The data driving voltage SVDD can be a constant voltage selected from 12V to 18V, but is not limited thereto. The gate high voltages VGH and VEH of the gate signals SCAN1, SCAN2, and EM can be a constant voltage selected from 10V to 13V, and the gate low voltages VGL and VEL can be a constant voltage selected from −13V to −10V, but are not limited thereto. Hereinafter, the gate low voltages VGL and VEL will be referred to as a gate-on voltage, and the gate high voltage VGH will be referred to as a gate-off voltage.

An anode electrode of the light-emitting element LD can be connected to a first power line PL1 to which the pixel driving voltage EVDD is applied. A cathode electrode of the light-emitting element LD can be connected to a first node n1.

The driving transistor DR can include a first electrode connected to the first node n1, a gate electrode connected to a second node n2, and a second electrode connected to a third node n3. A first capacitor Cst can be connected between the second node n2 and a fourth node n4.

The first switch transistor M1 is turned on in response to the gate-on voltage VGL of an EM signal EM and is turned off in response to the gate-off voltage VGH of the EM signal EM. The first switch transistor M1 includes a first electrode connected to the third node n3, a gate electrode connected to a third gate line GL3 to which the EM signal EM is applied, and a second electrode connected to a second power line PL2.

The second switch transistor M2 is turned on in response to the gate-on voltage VGL of the first scan signal SCAN1, and is turned off in response to the gate-off voltage VGH of the first scan signal SCAN1. When the second switch transistor M2 is turned on, the first power line PL1 to which the pixel driving voltage EVDD is applied can be electrically connected to the first node n1. The second switch transistor M2 includes a first electrode connected to the first power line PL1, a gate electrode connected to a first gate line GL1 to which the first scan signal SCAN1 is applied, and a second electrode connected to the first node n1.

The third switch transistor M3 is turned on in response to the gate-on voltage VGL of the EM signal EM and is turned off in response to the gate-off voltage VGH of the EM signal EM. When the third switch transistor M3 is turned on, the fourth node n4 can be electrically connected to a third power line PL3 to which the reference voltage Vref is applied. The third switch transistor M3 includes a first electrode connected to the fourth node n4, a gate electrode connected to the third gate line GL3, and a second electrode connected to the third power line PL3.

The fourth switch transistor M4 is turned on in response to the gate-on voltage VGL of the second scan signal SCAN2, and is turned off in response to the gate-off voltage VGH of the second scan signal SCAN2. When the fourth switch transistor M4 is turned on, the third node n3 can be electrically connected to the third power line PL3 to which the reference voltage Vref is applied. The fourth switch transistor M4 includes a first electrode connected to the third power line PL3, a gate electrode connected to a second gate line GL2 to which the second scan signal SCAN2 is applied, and a second electrode connected to the third node n3.

The fifth switch transistor M5 is turned on in response to the gate-on voltage VGL of the first scan signal SCAN1, and is turned off in response to the gate-off voltage VGH of the first scan signal SCAN1. When the fifth switch transistor M5 is turned on, a data line DL to which the data voltage Vdata is applied can be electrically connected to the fourth node n4. The fifth switch transistor M5 includes a first electrode connected to the data line DL, a gate electrode connected to the first gate line GL1 to which the first scan signal SCAN1 is applied, and a second electrode connected to the fourth node n4.

The sixth switch transistor M6 is turned on in response to the gate-on voltage VGL of the first scan signal SCAN1, and is turned off in response to the gate-off voltage VGH of the first scan signal SCAN1. When the sixth switch transistor M6 is turned on, the second node n2 can be electrically connected to the third node n3. The sixth switch transistor M6 includes a first electrode connected to the second node n2, a gate electrode connected to the first gate line GL1, and a second electrode connected to the third node n3.

The second capacitor C2 can be connected between the first power line PL1 and the first node n1. The third capacitor C3 can be connected between the first node n1 and the second node n2.

The pixel circuit can be driven in an initialization step, a sampling step, and a light emission step during a first frame period. The initialization step can be divided into a first initialization step and a second initialization step.

Figure 7A:
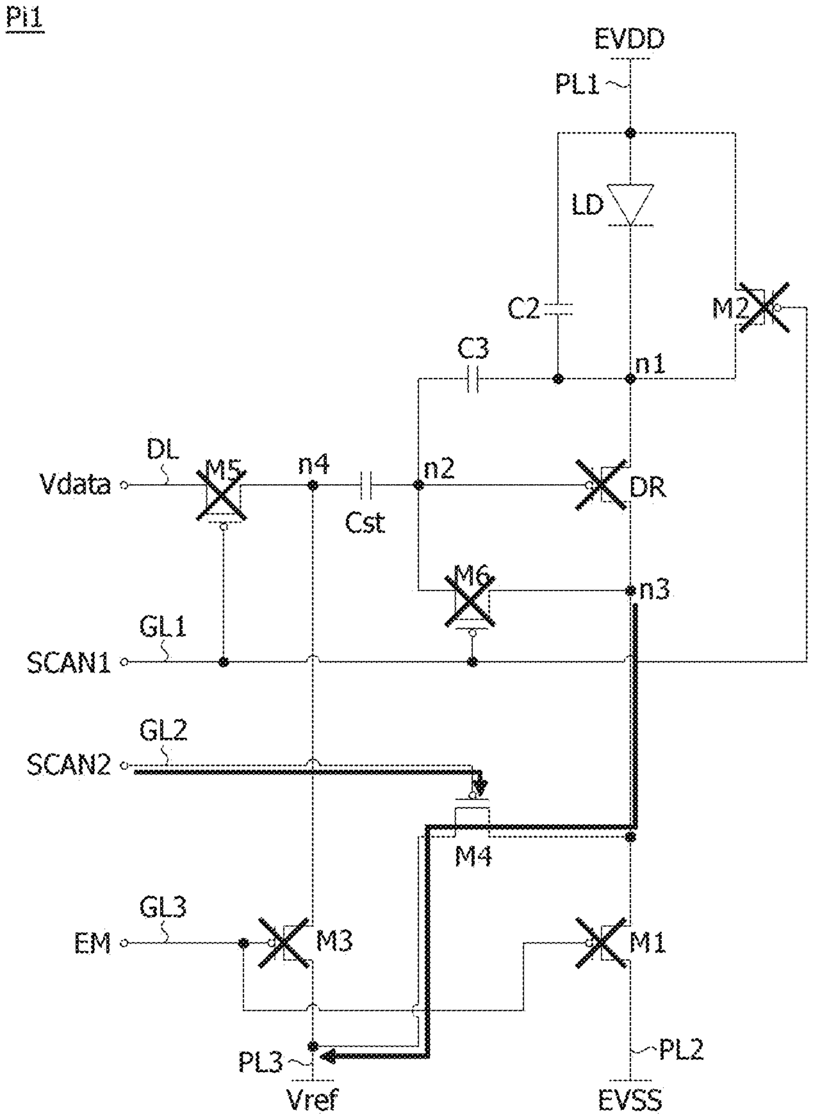
FIGS. 7A to 7D are circuit diagrams for explaining an operation principle of the pixel circuit shown in FIG. 5 according to an embodiment of the present disclosure.

Referring to FIGS. 6 and 7A, the first initialization step is performed during a first period Pi1. During the first period Pi1, the voltage of the second scan signal SCAN2 can be the gate-on voltage VGL, and the voltage of the first scan signal SCAN1 and the EM signal EM can be the gate-off voltage VGH. Accordingly, while the fourth switch transistor M4 is turned on during the first period Pi1, other switch transistors M1, M2, M3, M5, and M6 are in an off state. During the first period Pi1, the driving transistor DR is in the off state.

During the first period Pi1, a voltage of the third node n3 is initialized to the reference voltage Vref. During the first period Pi1, other nodes n1, n2, and n4 are electrically floated. During the first period Pi1, voltages of the first and second nodes n1 and n2 can be maintained at voltages charged in a previous frame period. A voltage of the fourth node n4 can be maintained at the reference voltage Vref charged in the light emission step of the previous frame. During the first period Pi1, a data voltage Vdata(n−1) of a previous pixel line, e.g., an (n−1)th pixel line, can be applied to the data line DL.

Figure 7B:
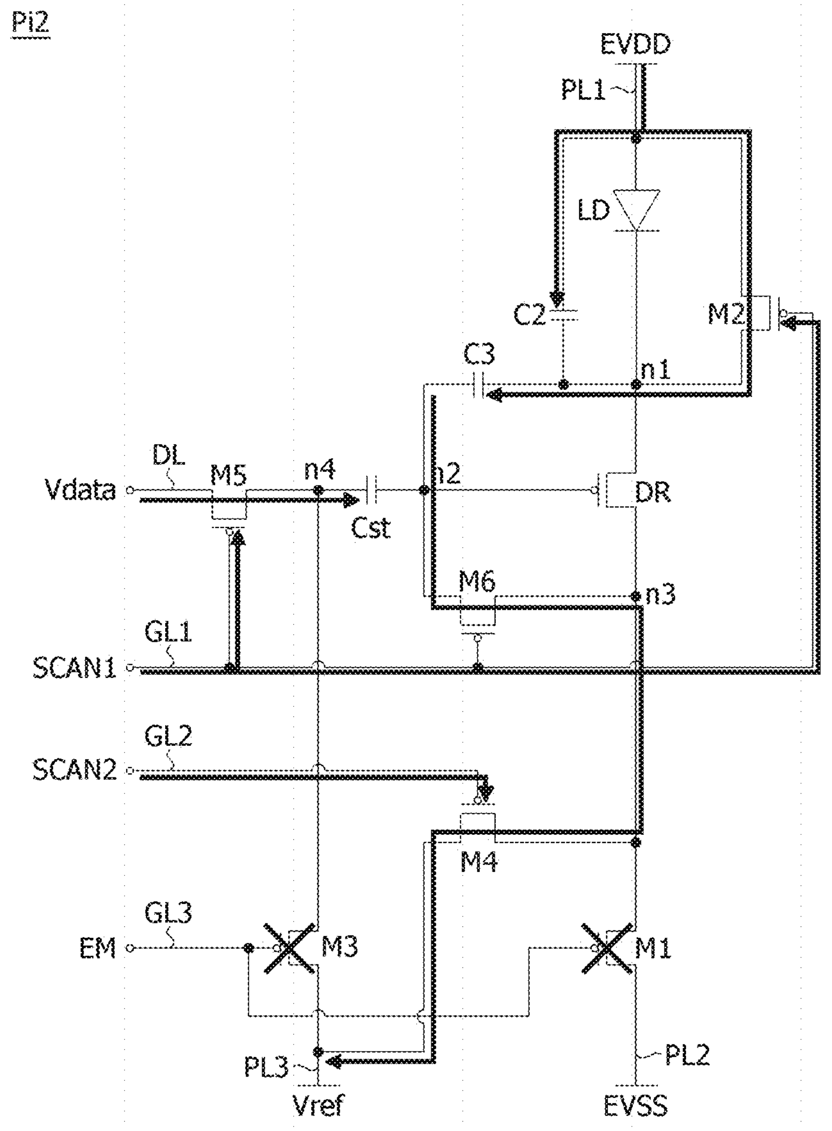

Referring to FIGS. 6 and 7B, the second initialization step is performed during a second period Pi2. During the second period Pi2, voltages of the first scan signal SCAN1 and the second scan signal SCAN2 can be a gate-on voltage VGL, and a voltage of the EM signal EM can be a gate-off voltage VGH. For example, the second period Pi2 can start by transitioning the first scan signal SCAN1 from the gate-off voltage VGH to the gate-on voltage VGL, while the second scan signal SCAN2 remains held at the gate-on voltage VGL and the EM signal EM remains held at the gate-off voltage VGH. Accordingly, the second, fifth, and sixth switch transistors M2, M5, and M6 are turned on during the second period Pi2, and the fourth switch transistor M4 is in an on state. In contrast, during the second period Pi2, the first and third switch transistors M1 and M3 are in the off state due to the EM signal EM being the gate-off voltage VGH. During the second period Pi2, the voltage of the first node n1 is increased so that the driving transistor DR is turned on.

During the second period Pi2, the data voltage Vdata (n) is applied to the data line DL. The data voltage Vdata (n) is applied to the fourth node n4 through the fifth switch transistor M5. During the second period Pi2, the reference voltage Vref is applied to the second and third nodes n2 and n3 through the fourth and sixth transistors M4 and M6. Therefore, during the second period Pi2, the voltage of the second node n2 is initialized to the reference voltage Vref, and the voltage of the fourth node n4 is the data voltage Vdata(n).

Figure 7C:
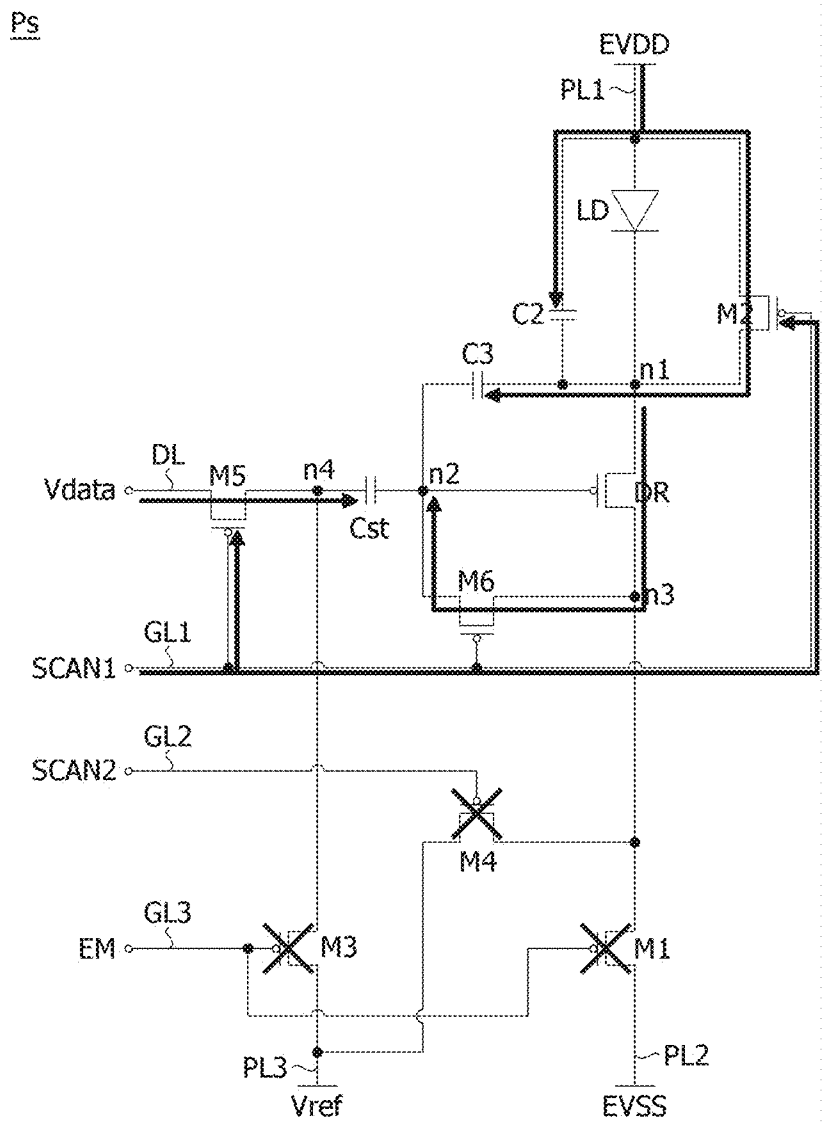

Referring to FIGS. 6 and 7C, the sampling step is performed during the third period Ps. During a third period Ps, the voltage of the first scan signal SCAN1 can be the gate-on voltage VGL, and the voltages of the second scan signal SCAN2 and the EM signal EM can be the gate-off voltage VGH. Accordingly, during the third period Ps, the second, fifth, and sixth switch transistors M2, M5, and M6 are in the on state, and the fourth switch transistor M4 is turned off. During the third period Ps, the first and third switch transistors M1 and M3 are in the off state. During the third period Ps, the voltage of the first node n1 is EVDD, and the voltage of the second node n2 is EVDD+Vth. The driving transistor DR is in the on state when entering the third period Ps and is turned off when the off condition (e.g., (Vs−Vg)+Vth<0) is reached. Here, Vs−Vg is a gate-source voltage of the driving transistor DR, and is a voltage difference between the voltage Vs of the second node n2 and the voltage Vn2=Vg of the first node n1.

When the driving transistor DR is turned off, the threshold voltage Vth of the driving transistor DR can be sampled and stored in the first capacitor Cst. During the third period Ps, a voltage of the fourth node n4 is a data voltage Vdata(n). The first capacitor Cst is charged by a voltage difference of a voltage of the fourth node n4 and a voltage of the second node n2.

Figure 7D:
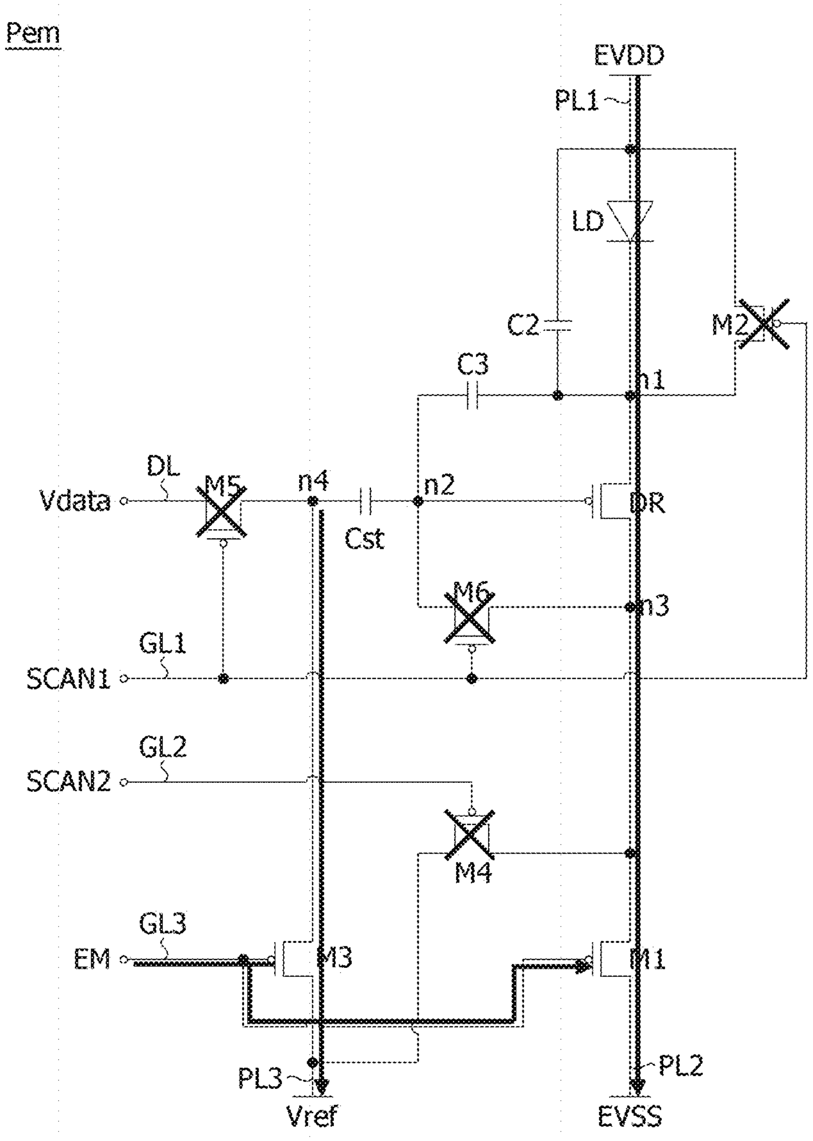

Referring to FIGS. 6 and 7D, the light emission step is performed during the fourth period (Pem). For example, the fourth period (Pem) can start by transitioning the EM signal EM from the gate-off voltage VGH to the gate-on voltage VGL, while the first scan signal SCAN1 and the second scan signal SCAN2 both remain held at the gate-off voltage VGH. During the fourth period (Pem), the voltage of the EM signal EM can be the gate-on voltage (VGL), and the voltages of the first scan signal SCAN1 and the second scan signal SCAN2 can be the gate-off voltage (VGH). Accordingly, during the fourth period (Pem), the first and third switch transistors M1 and M3 are turned on, whereas other switch transistors M2, M4, M5, and M6 are in the off state. During the fourth period (Pem), the driving transistor DR generates a current according to the gate-source voltage (Vgs) to drive the light-emitting element LD. The light-emitting element LD is controlled to emit light by the current ILD from the driving transistor DR during the fourth period (Pem).

Figure 8A:
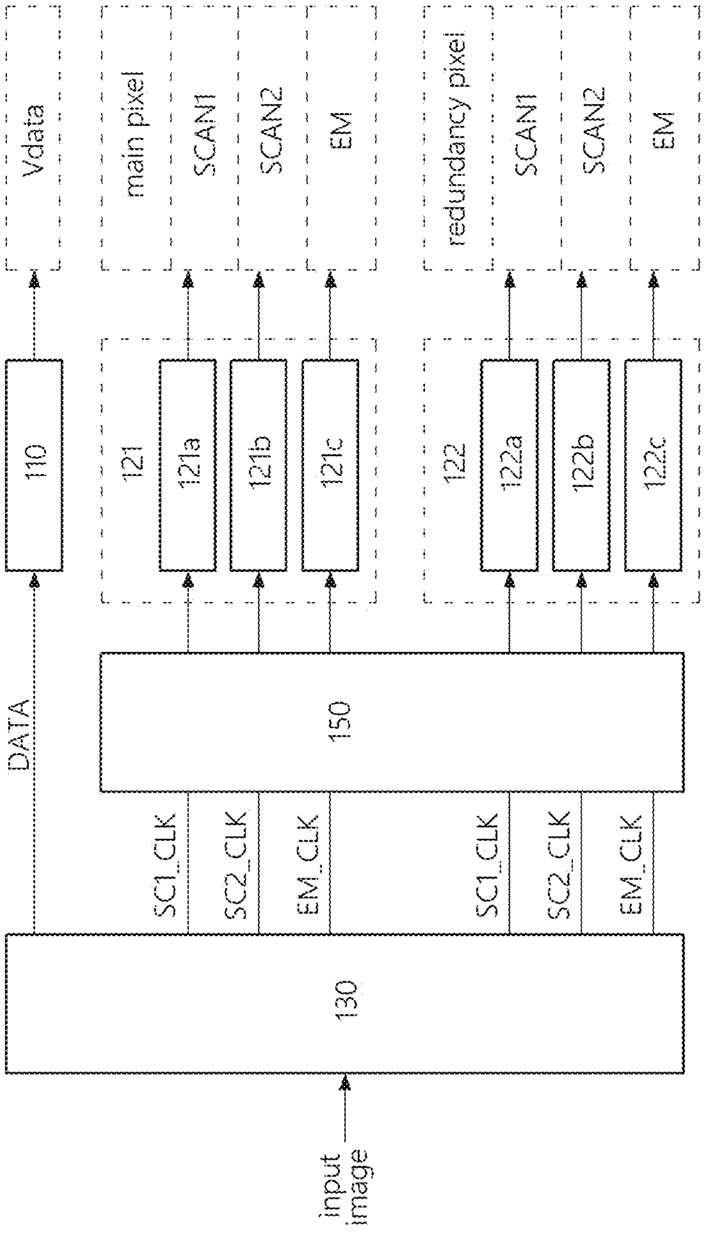
FIGS. 8A and 8B are diagrams for explaining an operation principle of a timing controller according to an embodiment of the present disclosure.
Figure 8B:
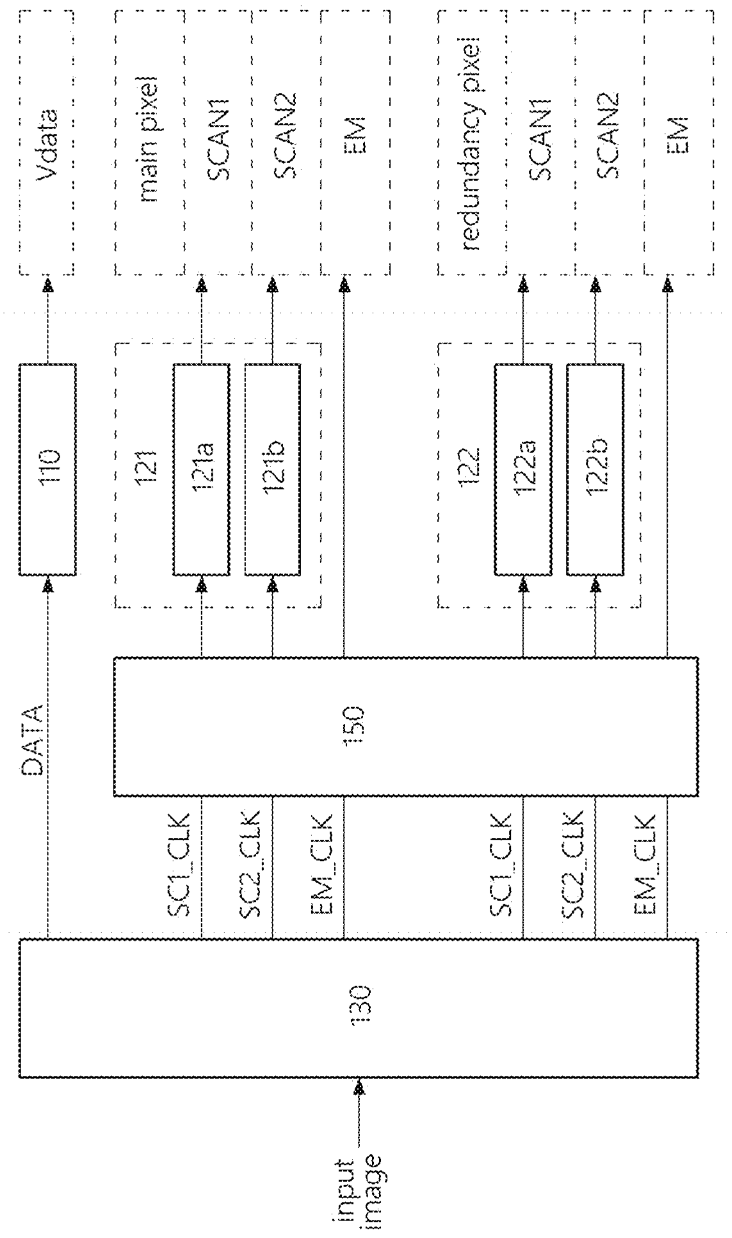

FIGS. 8A and 8B are diagrams for explaining an operation principle of a timing controller according to embodiments of the present disclosure.

Referring to FIG. 8A, a timing controller 130 can transmit pixel data of the input image to a data driver 110, and transmit the first to third gate timing control signals to a first gate driver 121 and a second gate driver 122.

For example, a first gate timing control signal can be a first scan clock signal SC1_CLK for generating the first scan signal SCAN1, a second gate timing control signal can be a second scan clock signal SC2_CLK for generating the second scan signal SCAN2, and a third gate timing control signal can be a light emission clock signal EM_CLK for generating the light emission signal EM.

Each of the first and second gate drivers 121 and 122 can include first scan drivers 121*a* and 122*a* for outputting a first scan signal SCAN1, second scan drivers 121*b* and 122*b* for outputting a second scan signal SCAN2, and EM drivers 121*c* and 122*c* for outputting a light emission signal EM.

The first scan drivers 121*a* and 122*a* can each output the first scan signal SCAN1 according to the first gate timing control signal, the second scan drivers 121*b* and 122*b* can each output the second scan signal SCAN2 according to the second gate timing control signal, and the EM drivers 121*c* and 122*c* can each output the light emission signal EM according to the third gate timing control signal.

The level shifter 150 can be disposed between the timing controller 130 and the first and second gate drivers 121 and 122. The level shifter 150 can convert an input signal of a first voltage level into a signal of a second voltage level greater than the first voltage level and output the signal.

Referring to FIG. 8B, the timing controller 130 can transmit pixel data of an input image to the data driver 110, transmit the first and second gate timing control signals to the first gate driver 121 and the second gate driver 122, and transmit the third gate timing control signal to each of the sub-pixels.

Here, the third gate timing control signal can be directly supplied to the sub-pixels through the level shifter 150 without being transmitted to the first and second gate drivers 121 and 122.

Figure 9:
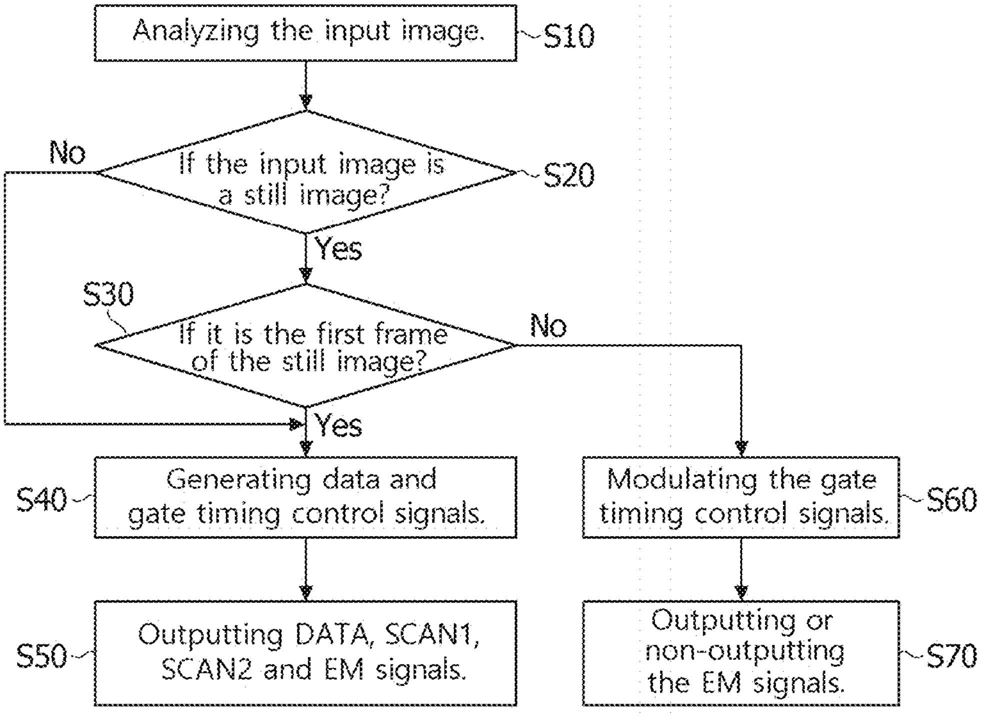
FIG. 9 is a flowchart illustrating a pixel driving method according to an embodiment of the present disclosure.

FIG. 9 is a flowchart illustrating a pixel driving method according to an embodiment of the present disclosure.

Referring to FIG. 9, when an input image is received, the timing controller 130 can analyze pixel data of the input image (S10) to determine whether the input image is a still image (S20), and generate a first gate timing control signal, a second gate timing control signal, and a third gate timing control signal if the input image is not a still image as a result of the determination (S40).

Next, the timing controller 130 can transmit the pixel data of the current frame to the data driver 110 and transmit the first to third gate timing control signals to the first and second gate drivers 121 and 122 (S50). Each of the first and second gate drivers can include a first scan driver that generates a first scan signal, a second scan driver that generates a second scan signal, and an EM driver that generates a light emission signal.

In this situation, the first to third gate timing control signals can be supplied so that the main sub-pixel and the redundancy sub-pixel of the same color are alternately driven for at least every one frame.

Next, if the input image is a still image, the timing controller 130 determines whether it is the first frame of the still image (S30), and as a result of the determination, if it is the first frame of the still image, pixel data and first to third gate timing control signals are generated (S40), pixel data of the current frame can be transmitted to the data driver 110, and first to third gate timing control signals can be transmitted to the first and second gate drivers 121 and 122 (S50).

On the other hand, if it is not the first frame of the still image, the timing controller 130 can modulate the first to third gate timing control signals without transmitting pixel data of the current frame (S60), and can transmit the modulated first to third gate timing control signals to the first and second gate drivers 121 and 122 (S70).

In this situation, the first to third gate timing control signals can be modulated so that the main sub-pixel and the redundancy sub-pixel of the same color are alternately driven for at least every two frames.

The first to third gate timing control signals can be modulated so that the first and second gate drivers do not output the gate signal for at least one frame. Here, modulating the first to third gate timing control signals means changing the first to third gate timing control signals into signals of gate-off voltages (e.g., the first to third gate timing control signals can be held at the gate-off voltage VGH).

In addition, the timing controller 130 can modulate the data timing control signal and may not transmit pixel data of the corresponding frame according to the modulated data timing control signal.

A method of outputting the first to third gate timing control signals from the timing controller of the embodiment can be implemented in various ways, and various embodiments will be described below.

Figure 10:
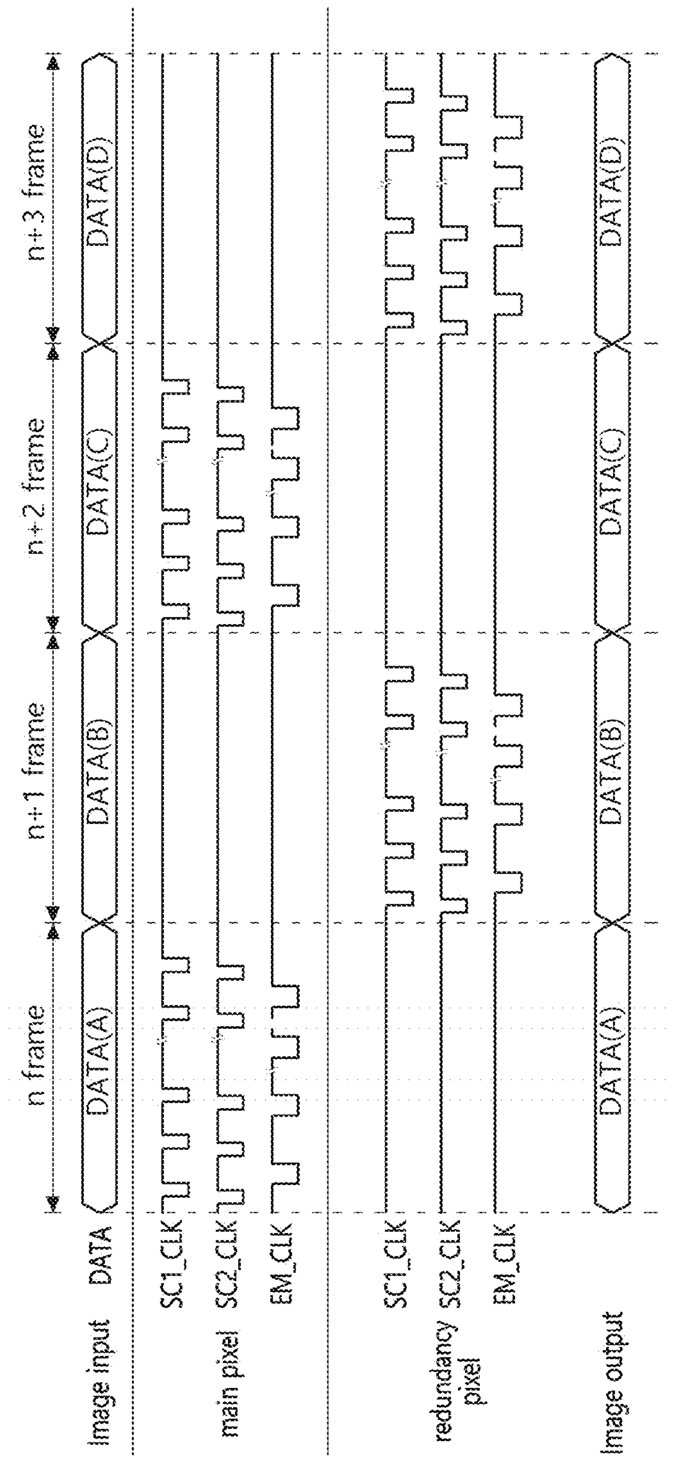
FIGS. 10 and 11 are diagrams for explaining a pixel driving principle according to an embodiment.
Figure 11:
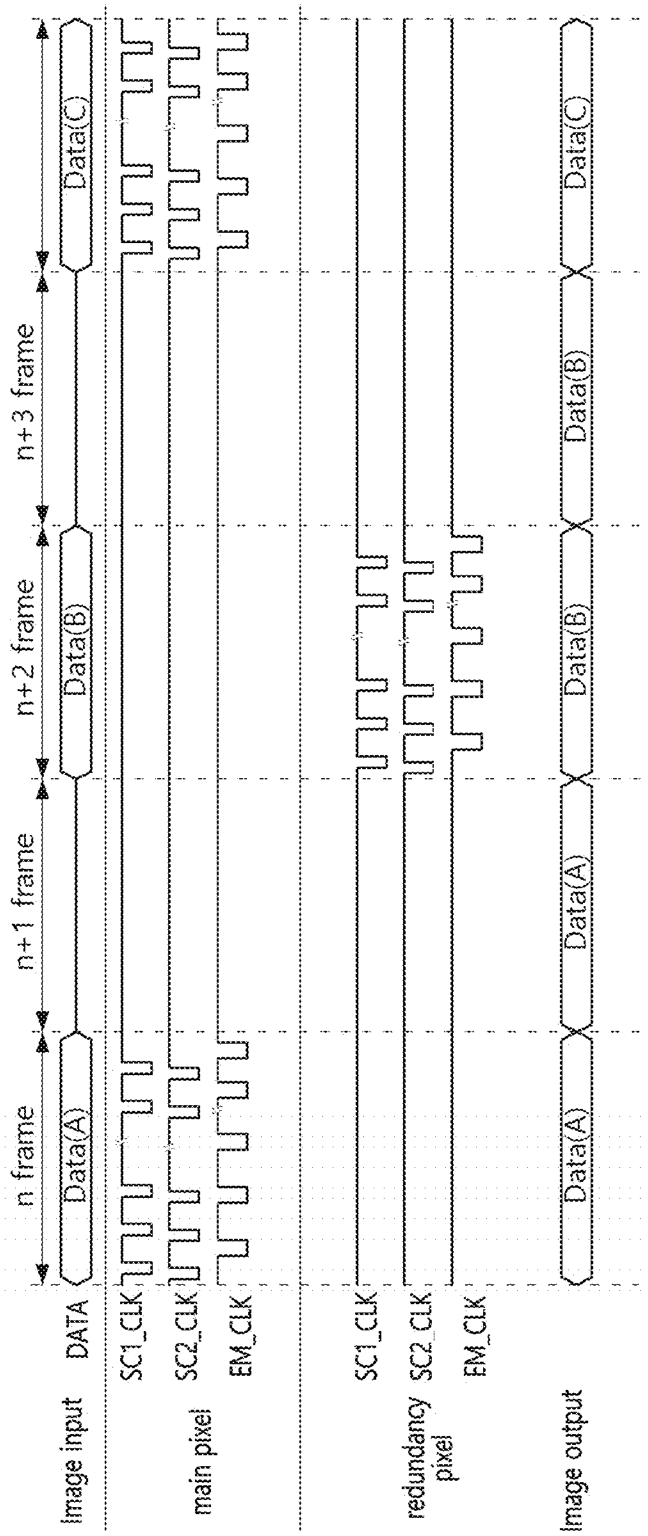

FIGS. 10 and 11 are diagrams for explaining a pixel driving principle according to a first embodiment.

Referring to FIG. 10, in the situation of displaying a normal image, the main sub-pixels S1, S2, and S3 and the redundancy sub-pixels S4, S5, and S6 can be alternately driven at intervals of a predetermined time, e.g., I frame periods (where I is a natural number). An example in which the predetermined time is assumed to be 1 frame period will be described.

During the (n)th frame period FR_n, the timing controller can output an (n)th frame image A for the main sub-pixels S1, S2, and S3 and the pulses of the first to third gate timing control signals SC1_CLK, SC2_CLK, and EM_CLK. In this situation, the main sub-pixels S1, S2, and S3 can display the (n)th frame image A.

During an (n+1)th frame period FR_(n+1), the timing controller can output an (n+1)th frame image B for the redundancy sub-pixels S4, S5, and S6 and the pulses of the first to third gate timing control signals SC1_CLK, SC2_CLK, and EM_CLK. In this situation, the redundancy sub-pixels S4, S5, and S6 can display the (n+1)th frame image B.

During an (n+2)th frame period FR_(n+2), the timing controller can output an (n+2)th frame image C for the main sub-pixels S1, S2, and S3 and the pulses of the first to third gate timing control signals SC1_CLK, SC2_CLK, and EM_CLK. In this situation, the main sub-pixels S1, S2, and S3 can display the (n+2)th frame image C.

During the (n+3)th frame period FR_(n+3), the timing controller can output an (n+3)th frame image D for the redundancy sub-pixels S4, S5, and S6 and the pulses of the first to third gate timing control signals SC1_CLK, SC2_CLK, and EM_CLK. In this situation, the redundancy sub-pixels S4, S5, and S6 can display the (n+3)th frame image D.

As described above, the main sub-pixels S1, S2, and S3 and the redundancy sub-pixels S4, S5, and S6 can be alternately driven in one frame period, and the normal images A, B, C, and D can be sequentially displayed. For example, during normal display driving (e.g., for moving video images), the image data can be updated at every frame, and the main sub-pixels S1, S2, and S3 and the redundancy sub-pixels S4, S5, and S6 can take turns, switching back and forth, to display the updated images for each frame.

Referring to FIG. 11, in the situation of displaying a still image, the main sub-pixels S1, S2, and S3 and the redundancy sub-pixels S4, S5, and S6 can be alternately driven at intervals of a predetermined time, e.g., I frame periods (where I is a natural number). An example in which the predetermined time is assumed to be 2 frame periods will be described.

During the (n)th frame period FR_n, the timing controller can output the (n)th frame image A for the main sub-pixels S1, S2, and S3 and the pulses of the first to third gate timing control signals SC1_CLK, SC2_CLK, and EM_CLK. In this situation, the main sub-pixels S1, S2, and S3 can display the (n)th frame image A.

The timing controller does not output any pulse during the (n+1)th frame period FR_(n+1). Accordingly, the main sub-pixels S1, S2, and S3 can display the (n)th frame image A.

During the (n+2)th frame period FR_(n+2), the timing controller can output the (n+2)th frame image B for the redundancy sub-pixels S4, S5, and S6 and the pulses of the first to third gate timing control signals SC1_CLK, SC2_CLK, and EM_CLK. In this situation, the redundancy sub-pixels S4, S5, and S6 can display the (n+2)th frame image B.

During the (n+3)th frame period FR_(n+3), the timing controller does not output any signal. Accordingly, the redundancy sub-pixels S4, S5, and S6 can display an (n+2)th frame image B.

As described above, while the main sub-pixels S1, S2, and S3 and the redundancy sub-pixels S4, S5, and S6 are alternately driven at intervals of two frame periods, the still images A and B can be sequentially displayed. For example, the refresh period or driving frequency for displaying the still images can be lower than the refresh period or driving frequency for displaying the normal images.

Figure 12:
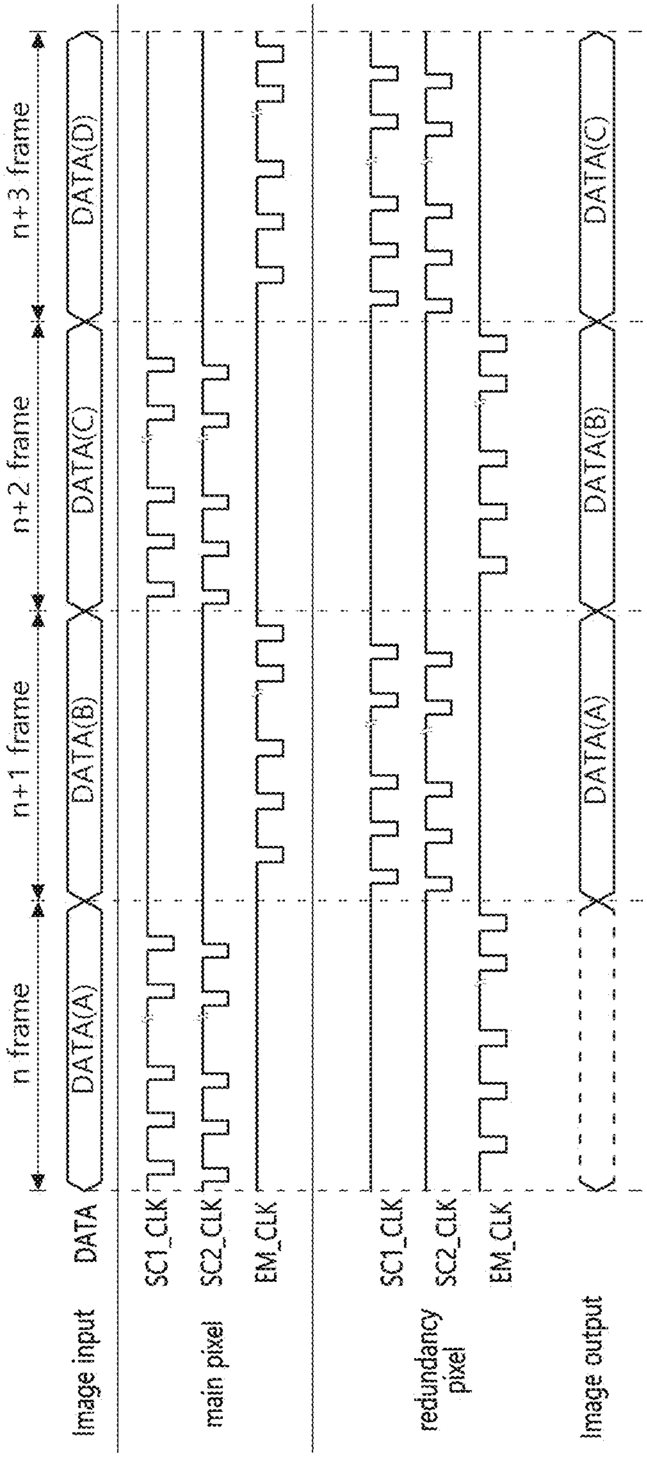
FIGS. 12 to 14 are diagrams for explaining a pixel driving principle according to an embodiment.
Figure 13:
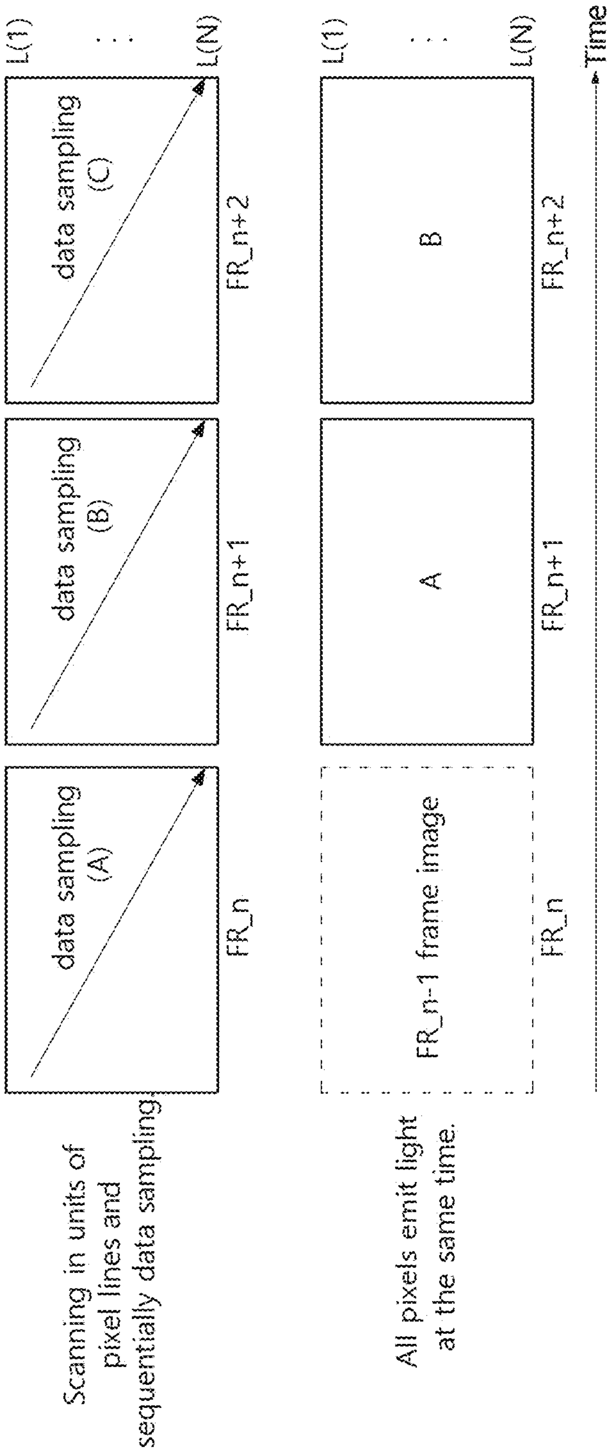
Figure 14:
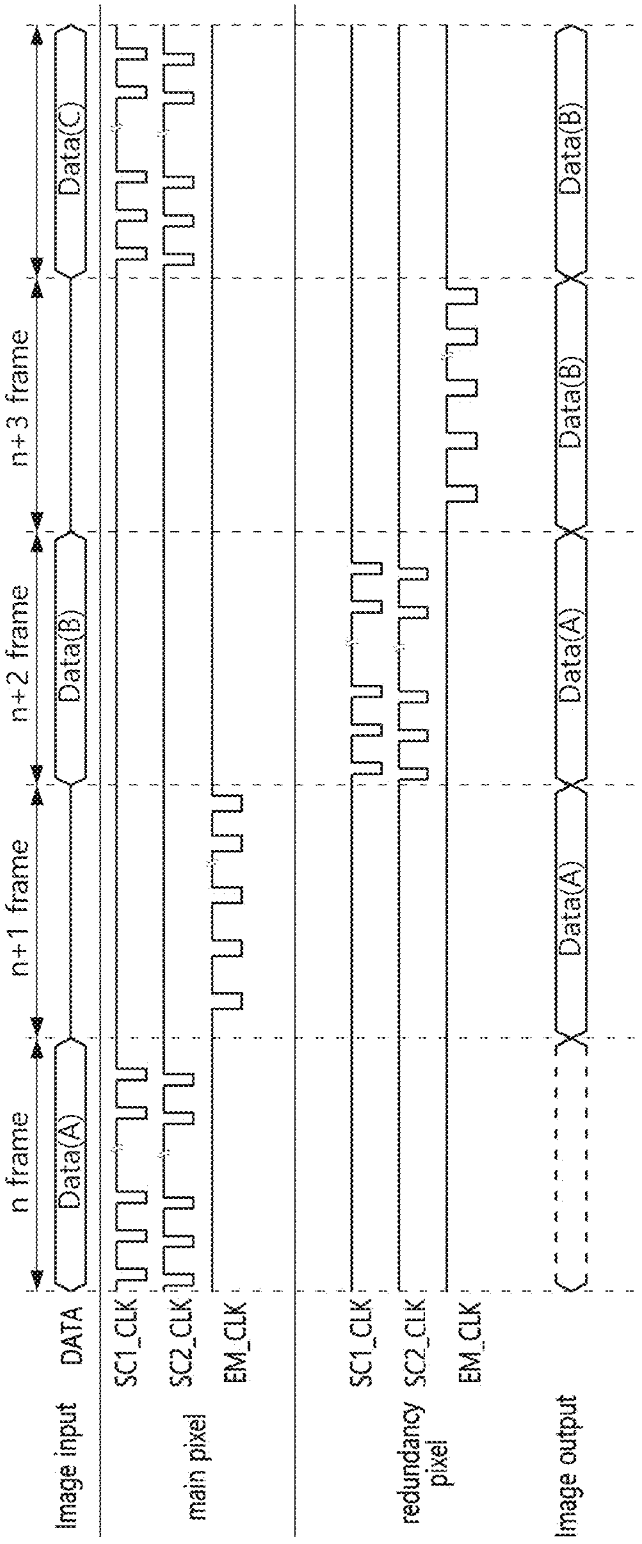

FIGS. 12 to 14 are diagrams for explaining a pixel driving principle according to a second embodiment.

Referring to FIGS. 12 and 13, in the situation of displaying a normal image, the main sub-pixels S1, S2, and S3 and the redundancy sub-pixels S4, S5, and S6 can be alternately driven at intervals of a predetermined time, e.g., I frame periods (where I is a natural number). An example in which the predetermined time is assumed to be 1 frame period will be described.

During the (n)th frame period FR_n, the timing controller can output the (n)th frame image A for the main sub-pixels S1, S2, and S3 and the pulses of the first to second gate timing control signals SC1_CLK and SC2_CLK. In this situation, the main sub-pixels S1, S2, and S3 can perform the initialization step and the sampling step to charge the data voltage of the (n)th frame image A.

During the (n+1)th frame period FR_(n+1), the timing controller can output the pulses of the third gate timing control signal EM_CLK for the main sub-pixels S1, S2, and S3, and output the (n+1)th frame image B for the redundancy sub-pixels S4, S5, and S6 and the pulses of the first to second gate timing control signals SC1_CLK and SC2_CLK. In this situation, the redundancy sub-pixels S4, S5, and S6 can perform the initialization and sampling steps to charge a data voltage of the (n+1)th frame image B, and the light-emitting elements of the main sub-pixels S1, S2, and S3 can emit light with the data voltage of the (n)th frame image A to display the (n)th frame image A.

During the (n+2)th frame period FR_(n+2), the timing controller can output the (n+2)th frame image C for the main sub-pixels S1, S2, and S3 and the pulses of the first to second gate timing control signals SC1_CLK and SC2_CLK, and output the pulses of the third gate timing control signal EM_CLK for the redundancy sub-pixels S4, S5, and S6. In this situation, the main sub-pixels S1, S2, and S3 performs an initialization step and a sampling step to charge a data voltage of the (n+2)th frame image C, and the light-emitting elements of the redundancy sub-pixels S4, S5, and S6 can emit light with the data voltage of the (n+1)th frame image B to display the (n+1)th frame image B.

During the (n+3)th frame period FR_(n+3), the timing controller can output the third gate timing control signal EM_CLK for the main sub-pixels S1, S2, and S3, and output the (n+3)th frame image D for the redundancy sub-pixels S4, S5, and S6 and the pulses of the first to second gate timing control signals SC1_CLK and SC2_CLK. In this situation, the redundancy sub-pixels S4, S5, and S6 can perform the initialization and sampling steps to charge a data voltage of the (n+3)th frame image D, and the light-emitting elements of the main sub-pixels S1, S2, and S3 can emit light with the data voltage of the (n+2)th frame image C to display the (n+2)th frame image C.

As described above, the main sub-pixels S1, S2, and S3 and the redundancy sub-pixels S4, S5, and S6 can be alternately driven at intervals of one frame period, and the normal images A, B, C, and D can be sequentially displayed. In this way, images are always being displayed by switching between displaying an image with the main sub-pixels S1, S2, and S3 and displaying an image with the redundancy sub-pixels S4, S5, and S6. In other words, each pixel unit can include two groups of sub-pixels, e.g., a first group including the main sub-pixels S1, S2, and S3, and a second group including the redundancy sub-pixels S4, S5, and S6. Thus, while the first group is getting ready and is busy performing initialization and sampling operations, the second group can be displaying image data, and vice-versa. For example, the two different groups of sub-pixels can cover for each other so that image data is constantly and continuously being displayed to a viewer. Also, the lifespan of the pixel unit can be extended because display operations can be carried out by the two different groups of sub-pixels in an alternating manner.

In the situation of the tiling display TD as shown in FIG. 2, the sub-pixels can be data sampled or addressed as pulses of scan signals are sequentially shifted in units of pixel lines in the display panels. When the display panels of the tiling display TD have different data sampling timings, the positions of pixel lines in which data of a previous frame image is displayed between the display panels when an image is reproduced can be different from each other, and the positions of pixel lines in which data of a current frame image is displayed can be different from each other. In this situation, a boundary or discontinuity may be noticeable to a viewer in a moving object image between adjacent display panels in the tiling display, which can impair the viewing experience.

When the alternating driving shown in FIGS. 12 and 13 is applied to the tiling display, all pixels of the display panels emit light for every frame period, thereby preventing tearing of an object or a phenomenon in which a boundary is visible within the object in the image of the boundary, and image quality can be improved.

Referring to FIG. 14, in the situation of displaying a still image, the main sub-pixels S1, S2, and S3 and the redundancy sub-pixels S4, S5, and S6 can be alternately driven at intervals of a predetermined time, e.g., I frame periods (where I is a natural number). An example in which the predetermined time is assumed to be 2 frame periods will be described.

During the (n)th frame period FR_n, the timing controller can output the (n)th frame image A for the main sub-pixels S1, S2, and S3 and the pulses of the first to second gate timing control signals SC1_CLK and SC2_CLK. In this situation, the main sub-pixels S1, S2, and S3 can perform the initialization step and the sampling step to charge the data voltage of the (n)th frame image A.

During the (n+1)th frame period FR_(n+1), the timing controller can output pulses of the third gate timing control signal EM_CLK for the main sub-pixels S1, S2, and S3. In this situation, the light-emitting elements of the main sub-pixels S1, S2, and S3 can emit light with the data voltage of the (n)th frame image A to display the (n)th frame image A.

During the (n+2)th frame period FR_(n+2), the timing controller can output the (n+2)th frame image B for the redundancy sub-pixels S4, S5, and S6 and the pulses of the first to second gate timing control signals SC1_CLK and SC2_CLK. In this situation, the redundancy sub-pixels S4, S5, and S6 can perform the initialization step and the sampling step to charge the data voltage of the (n+2)th frame image B.

During the (n+3)th frame period FR_(n+3), the timing controller can output pulses of the third gate timing control signal EM_CLK for the redundancy sub-pixels S4, S5, and S6. In this situation, the light-emitting elements of the redundancy sub-pixels S4, S5, and S6 can emit light with a data voltage of the (n+2)th frame image B to display the (n+2)th frame image B.

As described above, while the main sub-pixels S1, S2, and S3 and the redundancy sub-pixels S4, S5, and S6 are alternately driven in two frame periods, still images A and B can be sequentially displayed and power consumption can be reduced.

Figure 15:
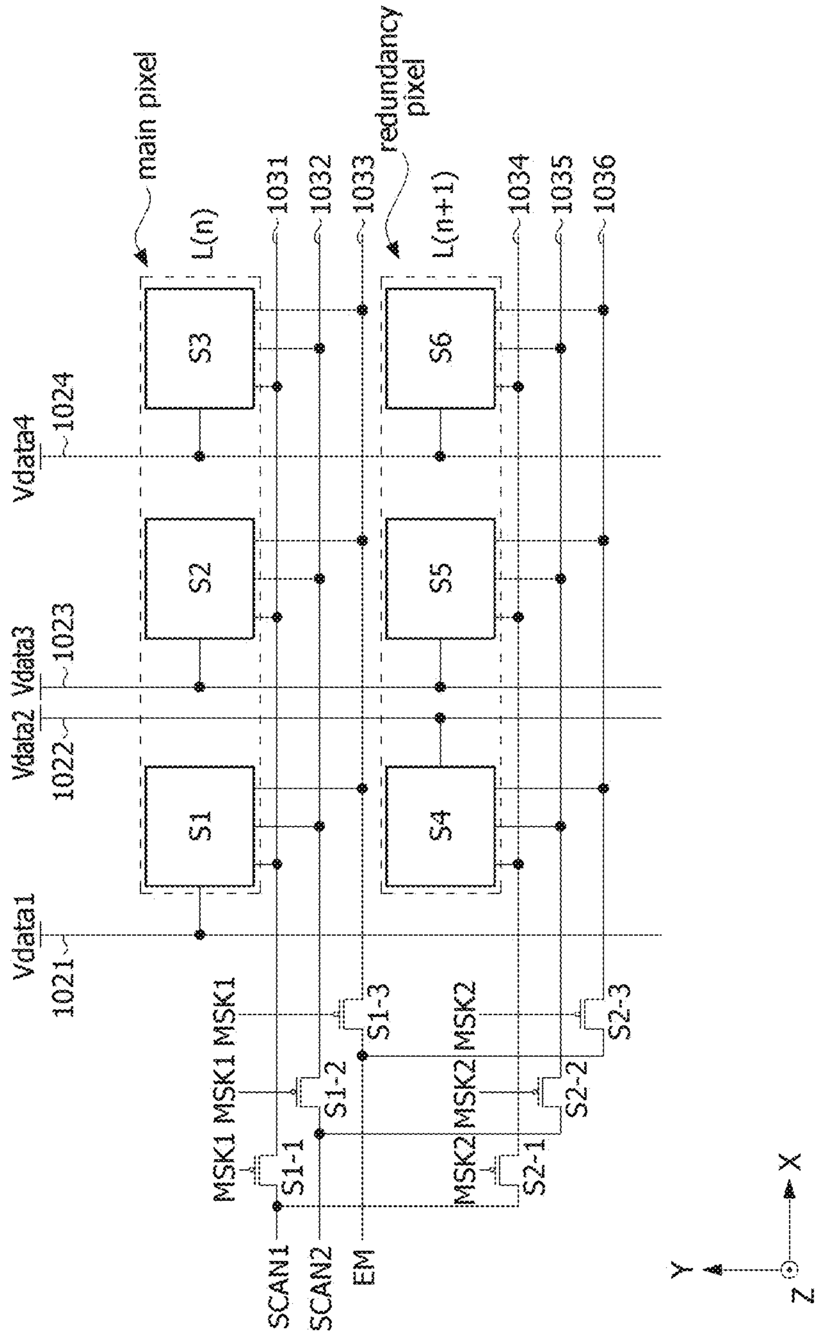
FIG. 15 is a diagram illustrating a unit pixel structure according to an embodiment of the present disclosure.

FIG. 15 is a diagram illustrating a unit pixel structure according to the second embodiment of the present disclosure, which can reduce gate line wiring and save space.

Referring to FIG. 15, a pixel can include two sub-pixels for each color. For example, the (1-1)th and (1-2)th sub-pixels S1 and S4 can be red sub-pixels to which a data voltage of red data is applied. The (2-1)th and (2-2)th sub-pixels S2 and S5 can be green sub-pixels to which a data voltage of green data is applied. The (3-1)th and (3-2)th sub-pixels S3 and S6 can be blue sub-pixels to which a data voltage of blue data is applied.

The (1-1)th, (2-1)th, and (3-1)th sub-pixels S1, S2, and S3 can be interpreted as main sub-pixels. The (1-2)th, (2-2)th, and (3-2)th sub-pixels S2, S5, and S6 can be interpreted as redundancy or auxiliary sub-pixels.

In this situation, the (1-1)th and (1-2)th sub-pixels S1 and S4 can be connected to different data lines 1021 and 1022, the (2-1)th and (2-2)th sub-pixels S2 and S5 can be connected in common to one data line 1023, and the (3-1)th and (3-2)th sub-pixels S3 and S6 can be connected in common to one data line 1024.

In addition, the sub-pixels of the same color for different pixel lines share gate lines to which the first and second scan signals SCAN1 and SCAN2 and the EM signal EM are applied, but the gate lines can be branched by the first selection switch elements (including the (1-1)th to (1-3)th selection switch elements S1-1, S1-2, and S1-3) and second selection switch elements (including the (2-1)th to (2-3)th select switch elements S2-1, S2-2, and S2-3). For example, the sub-pixels S1, S2, and S3 disposed in the (n)th pixel line L(n) (where n is a natural number) are connected to the (1-1)th gate line 1031, the (2-1)th gate line 1032, and the (3-1)th gate line 1033 and the sub-pixels S4, S5, and S6 disposed in the (n+1)th pixel line L (n+1) can be connected to the (1-2)th gate line 1034, the (2-2)th gate line 1035, and the (3-2)th gate line 1036.

The (1-1)th to (1-3)th selection switch elements S1-1, S1-2, and S1-3 can connect first to third gate lines to which the first and second scan signals SCAN1 and SCAN2 and the EM signal EM are applied to the main sub-pixels S1, S2, and S3 by the first mask signal MSK1 applied from the timing controller. The (1-1)th selection switch element S1-1 is turned on by the gate-on voltage of the first mask signal MSK1, and includes a gate electrode to which the first mask signal MSK1 is applied, a first electrode connected to the first gate line to which the first scan signal SCAN1 is applied, and a second electrode connected to the (1-1)th gate line 1031. The (1-2)th selection switch element S1-2 is turned on by the gate-on voltage of the first mask signal MSK1, and includes a gate electrode to which the first mask signal MSK1 is applied, a first electrode connected to the second gate line to which the second scan signal SCAN2 is applied, and a second electrode connected to the (2-1)th gate line 1032. The (1-3)th selection switch element S1-3 is turned on by the gate-on voltage of the first mask signal MSK1, and includes a gate electrode to which the first mask signal MSK1 is applied, a first electrode connected to the third gate line to which the EM signal EM is applied, and a second electrode connected to the (3-1)th gate line 1033.

The (2-1)th to (2-3)th select switch elements S2-1, S2-2, and S2-3 can connect the first to third gate lines to which the first and second scan signals SCAN1 and SCAN2 and the EM signal EM are applied to the redundancy sub-pixels S4, S5, and S6 by the second mask signal MSK2 applied from the timing controller. The (2-1)th select switch element S2-1 is turned on by the gate-on voltage of the second mask signal MSK2, and includes a gate electrode to which the second mask signal MSK2 is applied, a first electrode connected to the first gate line to which the first scan signal SCAN1 is applied, and a second electrode connected to the (1-2)th gate line 1034. The (2-2)th select switch element S2-2 is turned on by the gate-on voltage of the second mask signal MSK2, and includes a gate electrode to which the second mask signal MSK2 is applied, a first electrode connected to the second gate line to which the second scan signal SCAN2 is applied, and a second electrode connected to the (2-2)th gate line 1035. The (2-3)th selection switch element S2-3 is turned on by the gate-on voltage of the second mask signal MSK2, and includes a gate electrode to which the second mask signal MSK2 is applied, a first electrode connected to the third gate line to which the EM signal EM is applied, and a second electrode connected to the (3-2)th gate line 1036.

Figure 17:
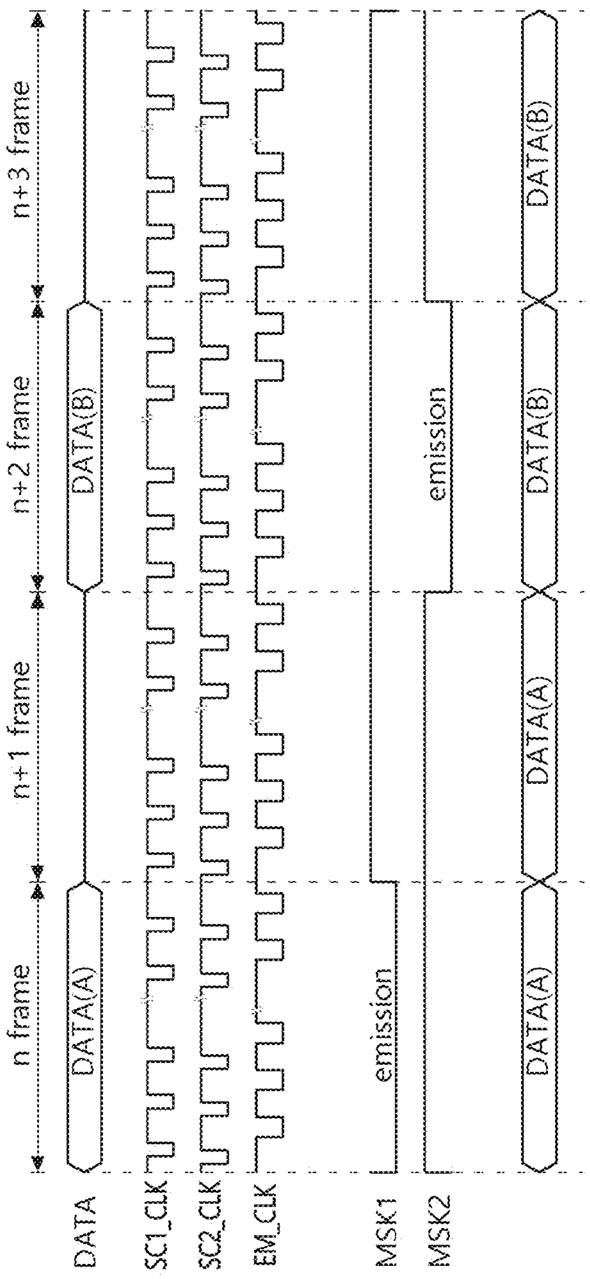

FIGS. 16 and 17 are diagrams for explaining a pixel driving principle according to a third embodiment.

Referring to FIG. 16, in the situation of displaying a normal image (e.g., moving video image data), the main sub-pixels S1, S2, and S3 and the redundancy sub-pixels S4, S5, and S6 can be alternately driven at intervals of a predetermined time, e.g., I frame periods (where I is a natural number). An example where the predetermined time is assumed to be 1 frame period can be described.

During the (n)th frame period FR_n, the timing controller can output the (n)th frame image A and the pulses of the first to third gate timing control signals SC1_CLK, SC2_CLK, and EM_CLK, and output the first mask signal MSK1 having the first voltage level for selectively driving the main sub-pixels S1, S2, and S3 and the second mask signal MSK2 having the second voltage level for non-driving the redundancy sub-pixels S4, S5, and S6. In this situation, the main sub-pixels S1, S2, and S3 can display the (n)th frame image A.

During the (n+1)th frame period FR_(n+1), the timing controller can output the (n+1)th frame image B and the pulses of the first to third gate timing control signals SC1_CLK, SC2_CLK, and EM_CLK, and output the second mask signal MSK2 of the first voltage level for selectively driving the redundancy sub-pixels S4, S5, and S6 and the first mask signal MSK1 of the second voltage level for non-driving the main sub-pixels S1, S2, and S3. In this situation, the redundancy sub-pixels S4, S5, and S6 can display the (n+1)th frame image B.

During the (n+2)th frame period FR_(n+2), the timing controller can output the (n+2)th frame image C and the pulses of the first to third gate timing control signals SC1_CLK, SC2_CLK, and EM_CLK, and output the first mask signal MSK1 of the first voltage level for selectively driving the main sub-pixels S1, S2, and S3 and the second mask signal MSK2 of the second voltage level for non-driving the redundancy sub-pixels S4, S5, and S6. In this situation, the main sub-pixels S1, S2, and S3 can display the (n+2)th frame image C.

During the (n+3)th frame period FR_n+3), the timing controller can output the (n+3)th frame image D and the pulses of the first to third gate timing control signals SC1_CLK, SC2_CLK, and EM_CLK, and output the second mask signal MSK2 of the first voltage level for selectively driving the redundancy sub-pixels S4, S5, and S6 and the first mask signal MSK1 of the second voltage level for non-driving the main sub-pixels S1, S2, and S3. In this situation, the redundancy sub-pixels S4, S5, and S6 can display the (n+3)th frame image D.

As described above, the main sub-pixels S1, S2, and S3 and the redundancy sub-pixels S4, S5, and S6 can be alternately driven at intervals of one frame period, and the normal images A, B, C, and D can be sequentially displayed.

Referring to FIG. 17, in the situation of displaying a still image (e.g., static image data), the main sub-pixels S1, S2, and S3 and the redundancy sub-pixels S4, S5, and S6 can be alternately driven at intervals of a predetermined time, e.g., I frame periods (where I is a natural number). An example in which the predetermined time is assumed to be 2 frame periods will be described.

During the (n)th frame period FR_n, the timing controller can output the (n)th frame image A and the pulses of the first to third gate timing control signals SC1_CLK, SC2_CLK, and EM_CLK, and output the first mask signal MSK1 having the first voltage level for selectively driving the main sub-pixels S1, S2, and S3 and the second mask signal MSK2 having the second voltage level for non-driving the redundancy sub-pixels S4, S5, and S6. In this situation, the main sub-pixels S1, S2, and S3 can display the (n)th frame image A.

During the (n+1)th frame period FR_(n+1), the timing controller can output the first mask signal MSK1 of the second voltage level for non-driving the main sub-pixels S1, S2, and S3 and the second mask signal MSK2 of the second voltage level for non-driving the redundancy sub-pixels S4, S5, and S6. Accordingly, the main sub-pixels S1, S2, and S3 can display the (n)th frame image A.

During the (n+2)th frame period FR_(n+2), the timing controller can output the (n+2)th frame image B and the pulses of the first to third gate timing control signals SC1_CLK, SC2_CLK, and EM_CLK, and output the second mask signal MSK2 of the first voltage level for selectively driving the redundancy sub-pixels S4, S5, and S6 and the first mask signal MSK1 of the second voltage level for non-driving the main sub-pixels S1, S2, and S3. In this situation, the redundancy sub-pixels S4, S5, and S6 can display the (n+2)th frame image B.

During the (n+3)th frame period FR_(n+3), the timing controller can output the first mask signal MSK1 of the second voltage level for non-driving the main sub-pixels S1, S2, and S3 and the second mask signal MSK2 of the second voltage level for non-driving the redundancy sub-pixels S4, S5, and S6. Accordingly, the main sub-pixels S1, S2, and S3 can display the (n+2)th frame image B.

As described above, while the main sub-pixels S1, S2, and S3 and the redundancy sub-pixels S4, S5, and S6 are alternately driven at intervals of two frame periods, still images A and B can be sequentially displayed. Also, the number of gate lines and wiring associated with the pixel unit can be reduced, space can be saved, and higher resolutions can be provided.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprising:

a display panel including a plurality of data lines, a plurality of gate lines, and a plurality of pixels, wherein each of the plurality of pixels includes:

a first-first sub-pixel configured to emit a first color of light and a first-second sub-pixel configured to emit the first color of light;

a second-first sub-pixel configured to emit a second color of light and a second-second sub-pixel configured to emit the second color of light; and a third-first sub-pixel configured to emit a third color of light and a third-second sub-pixel configured to emit the third color of light, and wherein the first-first, second-first, and third-first sub-pixels and the first-second, second-second, and third-second sub-pixels are configured to be alternately driven at intervals of at least one frame period, and wherein the first-first sub-pixel is connected to a first data line, the first-second sub-pixel is connected to a second data line, the second-first sub-pixel and the second-second sub-pixel are commonly connected to a third data line, and the third-first sub-pixel and the third-second sub-pixel are commonly connected to a fourth data line.

2. The display device of claim 1, wherein the first-first, second-first, and third-first sub-pixels, and the first-second, second-second, and third-second sub-pixels are connected to a plurality of different gate lines among the plurality of gate lines, and wherein the plurality of different gate lines include a first gate line configured to receive a first scan signal, a second gate line configured to receive a second scan signal, and a third gate line configured to receive a light emission signal.

3. The display device of claim 2, wherein, during an (n)th frame period, a data voltage of an (n)th frame is applied to the first-first, second-first, and third-first sub-pixels, and pulses of the first and second scan signals and the light emission signal are applied to the first-first, second-first, and third-first sub-pixels, wherein, during an (n+1)th frame period after the (n)th frame period, the pulses of the first and second scan signals and the light emission signal are applied to the first-second, second-second, and third-second sub-pixels while a data voltage of an (n+1)th frame is applied to the first-second, second-second, and third-second sub-pixels, and wherein n is a positive integer.

4. The display device of claim 2, wherein during an (n)th frame period, a data voltage of an (n)th frame is applied to the first-first, second-first, and third-first sub-pixels, and pulses of the first and second scan signals and the light emission signal are applied to the first-first, second-first, and third-first sub-pixels, wherein, during an (n+1)th frame period after the (n)th frame period, none of the pulses of the first and second scan signals and the light emission signal are applied to first-first, second-first, third-first, first-second, second-second, and third-second sub-pixels, wherein, during an (n+2)th frame period after the (n+1)th frame period, a data voltage of an (n+2)th frame is applied to the first-second, second-second, and third-second sub-pixels, and the pulses of the first and second scan signals and the light emission signal are applied to the first-second, second-second, and third-second sub-pixels, and wherein n is a positive integer.

5. The display device of claim 2, wherein during an (n)th frame period, pulses of the first and second scan signals are applied to the first-first, second-first, and third-first sub-pixels, and a pulse of the light emission signal is applied to the first-second, second-second and third-second sub-pixels, wherein, during an (n+1)th frame period after the (n)th frame period, the pulse of the light emission signal is applied to the first-second, second-second, and third-second sub-pixels, and the pulses of the first and second scan signals are applied to the first-second, second-second and third-second sub-pixels, and wherein n is a positive integer.

6. The display device of claim 2, wherein during an (n)th frame period, a data voltage of an (n)th frame is applied to the first-first, second-first, and third-first sub-pixels, and the first and second scan signals are applied to the first-first, second-first, and third-first sub-pixels, wherein during an (n+1)th frame period after the (n)th frame period, a pulse of the light emission signal is applied to the first-second, second-second, and third-second sub-pixels, wherein during an (n+2)th frame period after the (n+1)th frame period, a data voltage of an (n+2)th frame is applied to the first-second, second-second, and third-second sub-pixels, and pulses of the first and second scan signals are applied to the first-second, second-second, and third-second sub-pixels, and wherein during an (n+3)th frame period after the (n+2)th frame period, the pulse of the light emission signal is applied to the first-second, second-second, and third-second sub-pixels, and wherein n is a positive integer.

7. The display device of claim 2, wherein the first-first and first-second sub-pixels are respectively connected to first-first and first-second gate lines branched from the first gate line and configured to receive a first scan signal, wherein the second-first and second-second sub-pixels are respectively connected to second-first and second-second gate lines branched from the second gate line and configured to receive a second scan signal, and wherein the third-first and third-second sub-pixels are respectively connected to third-first and third-second gate lines branched from the third gate line and configured to receive a light emission signal.

8. The display device of claim 7, further comprising:

a first-first selection switch element connected between the first gate line and first-first gate line, a second-first selection switch element connected between the second gate line and second-first gate line, and a third-first selection switch element connected between the third gate line and the third-first gate line, and the first-first, second-first and third-first selection switch elements being configured to turn on in response to a first mask signal; and a first-second selection switch element connected between the first gate line and the first-second gate line, a second-second selection switch element connected between the second gate line and the second-second gate line, and a third-second selection switch element connected between the third gate line and the third-second gate line, and the first-second, second-second and third-second selection switch elements being configured to turn on in response to a second mask signal, and wherein the first and second mask signals are applied from a timing controller.

9. The display device of claim 8, wherein, during an (n)th frame period, a data voltage of an (n)th frame is applied to the first-first, second-first, third-first sub-pixels and the first-second, second-second and third-second sub-pixels, pulses of the first and second scan signals and the light emission signals are applied to the first-first, second-first, third-first sub-pixels and the first-second, second-second and third-second sub-pixels, and the first mask signal of a first voltage level is applied to the first-first, second-first and third-first selection switch elements and the second mask signal of a second voltage level is applied to the first-second, second-second and third-second selection switch elements, wherein, during an (n+1)th frame period after the (n)th frame period, a data voltage of an (n+1)th frame is applied to the first-first, second-first, third-first sub-pixels and the first-second, second-second and third-second sub-pixels, the pulses of the first and second scan signals and the light emission signal are applied to the first-first, second-first, third-first sub-pixels and the first-second, second-second and third-second sub-pixels, and the first mask signal of the second voltage level is applied to the first-first, second-first and third-first selection switch elements and the second mask signal of the first voltage level is applied to the first-second, second-second and third-second selection switch elements, wherein n is a positive integer, and wherein the first voltage level is lower than the second voltage level.

10. The display device of claim 8, wherein during an (n)th frame period, a data voltage of an (n)th frame is applied to the first-first, second-first, third-first sub-pixels and the first-second, second-second and third-second sub-pixels, pulses of the first and second scan signals and the light emission signal are applied to the first-first, second-first, third-first sub-pixels and the first-second, second-second and third-second sub-pixels, and the first mask signal of a first voltage level is applied to the first-first, second-first and third-first selection switch elements and the second mask signal of a second voltage level is applied to the first-second, second-second and third-second selection switch elements, wherein, during an (n+1)th frame period after the (n)th frame period, pulses of the first and second scan signals and the light emission signal are applied to the first-first, second-first, and third-first sub-pixels and the first-second, second-second and third-second sub-pixels, and the first mask signal of the second voltage level is applied to the first-first, second-first and third-first selection switch elements and the second mask signal of the second voltage level is applied to the first-second, second-second and third-second selection switch elements, wherein, during an (n+2)th frame period after the (n+1)th frame period, a data voltage of an (n+2)th frame is applied to the first-first, second-first, and third-first sub-pixels and the first-second, second-second and third-second sub-pixels, the pulses of the first and second scan signals and the light emission signal are applied to the first-first, second-first, third-first sub-pixels and the first-second, second-second and third-second sub-pixels, and the first mask signal of the second voltage level is applied to the first-first, second-first and third-first selection switch elements and the second mask signal of the first voltage level is applied to the first-second, second-second and third-second selection switch elements, wherein, during an (n+3)th frame period after the (n+2)th frame period, pulses of the first and second scan signals and the light emission signal are applied to the first-first, second-first, and third-first sub-pixels and the first-second, second-second and third-second sub-pixels, and the first mask signal of the second voltage is applied to the first-first, second-first and third-first selection switch elements and the second mask signal of the second voltage level is applied to the first-second, second-second and third-second selection switch elements, wherein n is a positive integer, and wherein the first voltage level is lower than the second voltage level.

11. A display device comprising:

a display panel including a plurality of data lines, a plurality of gate lines, and a plurality of pixels;

a data driver configured to output data voltages to the plurality of data lines;

a gate driver configured to output gate signals to the plurality of gate lines; and a timing controller configured to:

in response to determining that pixel data of an input image corresponds to a moving image, supply a gate timing control signal to the gate driver at a first driving frequency, and in response to determining that the pixel data of the input image corresponds to a still image to be displayed for multiple frames, supply the gate timing control signal to the gate driver at a second driving frequency lower than the first driving frequency, wherein each of the plurality of pixels includes:

a first-first sub-pixel configured to emit a first color of light and a first-second sub-pixel configured to emit the first color of light;

a second-first sub-pixel configured to emit a second color of light and a second-second sub-pixel configured to emit the second color of light; and a third-first sub-pixel configured to emit a third color of light and a third-second sub-pixel configured to emit the third color of light, and wherein the first-first sub-pixel is connected to a first data line, the first-second sub-pixel is connected to a second data line, the second-first sub-pixel and the second-second sub-pixel are commonly connected to a third data line, and the third-first sub-pixel and the third-second sub-pixel are commonly connected to a fourth data line.

12. The display device of claim 11, wherein the first-first, second-first, and third-first sub-pixels and the first-second, second-second, and third-second sub-pixels are connected to a plurality of different gate lines among the plurality of gate lines.

13. The display device of claim 12, wherein the timing controller is further configured to:

output a data voltage of an (n)th frame for the first-first, second-first, and third-first sub-pixels, and output a pulse of the gate timing control signal during an (n)th frame period, and output a data voltage of an (n+1)th frame for the first-second, second-second, and third-second sub-pixels, and output the pulse of the gate timing control signal during an (n+1)th frame period after the (n)th frame period, and wherein n is a positive integer.

14. The display device of claim 12, wherein the timing controller is further configured to:

output a data voltage of an (n)th frame for the first-first, second-first, and third-first sub-pixels, and a pulse of the gate timing control signal, during an (n)th frame period, not output a data voltage and the pulse of the gate timing control signal, during an (n+1)th frame period after the (n)th frame period, and output a data voltage of an (n+2) frame for the first-second, second-second, and third-second sub-pixels, and the pulse of the gate timing control signal, during the (n+2)th frame period after the (n+1)th frame period, and wherein n is a positive integer.

15. The display device of claim 12, wherein the gate timing control signal includes a first gate timing control signal for generating a first scan signal, a second gate timing control signal for generating a second scan signal, and a third gate timing control signal for generating a light emission signal, wherein the timing controller is further configured to:

output pulses of the first and second gate timing control signals for the first-first, second-first, and third-first sub-pixels, and a pulse of the third gate timing control signal for the first-second, second-second and third-second sub-pixels, during an (n)th frame period, and output the pulse of the third gate timing control signal for the first-second, second-second, and third-second sub-pixels, and the pulses of the first and second gate timing control signals for the first-second, second-second and third-second sub-pixels, during an (n+1)th frame period after the (n)th frame period, and wherein n is a positive integer.

16. The display device of claim 12, wherein the gate timing control signal includes a first gate timing control signal for generating a first scan signal, a second gate timing control signal for generating a second scan signal, and a third gate timing control signal for generating a light emission signal, wherein the timing controller is further configured to:

output a data voltage of an (n)th frame for the first-first, second-first, and third-first sub-pixels, and pulses of the first and second gate timing control signals, during an (n)th frame period, output a pulse of the third gate timing control signal for the first-second, second-second, and third-second sub-pixels, during an (n+1)th frame period after the (n)th frame period, output a data voltage of an (n+2)th frame for the first-second, second-second, and third-second sub-pixels, and the pulses of the first and second gate timing control signals, during an (n+2)th frame period after the (n+1)th frame period, and output the pulse of the third gate timing control signal for the first-second, second-second, and third-second sub-pixels, during an (n+3)th frame period after the (n+2)th frame period, and wherein n is a positive integer.

17. The display device of claim 12, wherein the first-first and first-second sub-pixels are respectively connected to first-first and first-second gate lines branched from a first gate line configured to receive a first scan signal, wherein the second-first and second-second sub-pixels are respectively connected to second-first and second-second gate lines branched from a second gate line configured to receive a second scan signal, and wherein the third-first and third-second sub-pixels are respectively connected to third-first and third-second gate lines branched from a third gate line configured to receive a light emission signal.

18. The display device of claim 17, further comprising:

a first-first selection switch element connected between the first gate line and first-first gate line, a second-first selection switch element connected between the second gate line and second-first gate line, and a third-first selection switch element connected between the third gate line and the third-first gate line, and the first-first, second-first and third-first selection switch elements being configured to turn on in response to a first mask signal; and a first-second selection switch element connected between the first gate line and the first-second gate line, a second-second selection switch element connected between the second gate line and the second-second gate line, and a third-second selection switch element connected between the third gate line and the third-second gate line, and the first-second, second-second and third-second selection switch elements being configured to turn on in response to a second mask signal, and wherein the first and second mask signals are applied from a timing controller.

19. The display device of claim 18, wherein the gate timing control signal includes a first gate timing control signal for generating the first scan signal, a second gate timing control signal for generating the second scan signal, and a third gate timing control signal for generating the light emission signal, and wherein the timing controller is further configured to:

output data voltages of an (n)th frame for the first-first, second-first, and third-first sub-pixels and the first-second, second-second, and third-second sub-pixels, pulses of the first to third gate timing control signals, and the first mask signal of a first voltage level and the second mask signal of a second voltage level, during an (n)th frame period, and output data voltages of an (n+1)th frame for the first-first, second-first, and third-first sub-pixels and the first-second, second-second, and third-second sub-pixels, the pulses of the first to third gate timing control signals, and the first mask signal of the second voltage level and the second mask signal of the first voltage level, during an (n+1)th frame period after the (n)th frame period, wherein n is a positive integer, and wherein the first voltage level is lower than the second voltage level.

20. The display device of claim 18, wherein the gate timing control signal includes a first gate timing control signal for generating the first scan signal, a second gate timing control signal for generating the second scan signal, and a third gate timing control signal for generating the light emission signal, and wherein the timing controller is further configured to:

output data voltages of an (n)th frame for the first-first, second-first, and third-first sub-pixels and the first-second, second-second, and third-second sub-pixels, pulses of the first to third gate timing control signals, and the first mask signal of a first voltage level and the second mask signal of a second voltage level, during an (n)th frame period, output pulses of the first to third gate timing control signals for the first-first, second-first, and third-first sub-pixels and the first-second, second-second and third-second sub-pixels, and the first and second mask signals of the second voltage level, during an (n+1)th frame period after the (n)th frame period, output a data voltage of an (n+2)th frame for the first-first, second-first, and third-first sub-pixels and the first-second, second-second, and third-second sub-pixels, the pulses of the first to third gate timing control signals, and the first mask signal of the second voltage level and the second mask signal of the first voltage level, during an (n+2) frame period after the (n+1)th frame period, output pulses of the first to third gate timing control signals for the first-first, second-first, and third-first sub-pixels and the first-second, second-second and third-second sub-pixels, and the first and second mask signals of the second voltage level, during an (n+3)th frame period after the (n+2)th frame period, wherein n is a positive integer, and wherein the first voltage level is set lower than the second voltage level.

21. A display device comprising:

a display panel including a plurality of data lines, a plurality of gate lines, and a plurality of pixels, at least one of the plurality of pixels including a main group of sub-pixels having a first-first sub-pixel, a second-first sub-pixel and a third-first sub-pixel, and a redundancy group of sub-pixels having first-second sub-pixel, a second-second sub-pixel and a third-second sub-pixel; and a controller configured to drive the main group of sub-pixels and the redundancy group of sub-pixels in an alternating manner to display images, wherein the first-first sub-pixel and the first-second sub-pixel are configured to emit a same first color of light, the second-first sub-pixel and the second-second sub-pixel are configured to emit a same second color of light, and the third-first sub-pixel and the third-second sub-pixel are configured to emit a same third color of light, and wherein the first-first sub-pixel is connected to a first data line, the first-second sub-pixel is connected to a second data line, the second-first sub-pixel and the second-second sub-pixel are commonly connected to a third data line, and the third-first sub-pixel and the third-second sub-pixel are commonly connected to a fourth data line.

22. The display device of claim 21, wherein the controller is further configured to:

in response to determining that pixel data of an input image corresponds to a moving image, alternatingly drive the main group of sub-pixels and the redundancy group of sub-pixels to display the pixel data at a first driving frequency, and in response to determining that the pixel data of the input image corresponds to a still image to be displayed for multiple frames, alternatingly drive the main group of sub-pixels and the redundancy group of sub-pixels to display the pixel data at a second driving frequency lower than the first driving frequency.

23. The display device of claim 21, wherein the first-first, second-first, and third-first sub-pixels, and the first-second, second-second, and third-second sub-pixels are connected to a plurality of different gate lines among the plurality of gate lines, and wherein the plurality of different gate lines include a first gate line configured to receive a first scan signal, a second gate line configured to receive a second scan signal, and a third gate line configured to receive a light emission signal.

* * * * *